US012743486B2

(12) United States Patent
Smith et al.

(10) Patent No.: US 12,743,486 B2
(45) Date of Patent: Sep. 22, 2026

(54) PREDICTING TARGETED, AGENCY-SPECIFIC RECOVERY EVENTS USING TRAINED ARTIFICIAL INTELLIGENCE PROCESSES

(71) Applicant: The Toronto-Dominion Bank, Toronto (CA)

(72) Inventors: Jonathan Anders James Smith, Toronto (CA); David Christopher O'Grady, Embrun (CA); Peiwen Zhong, Toronto (CA); Syeda Suhailah Rahman, Mississauga (CA); Eric Pelletier, Ottowa (CA); Jung Hoon Baek, Markham (CA); Maksims Volkovs, Toronto (CA); Tomi Johan Poutanen, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 1076 days.

(21) Appl. No.: 17/709,719

(22) Filed: Mar. 31, 2022

(65) Prior Publication Data

US 2022/0318573 A1 Oct. 6, 2022

Related U.S. Application Data

(60) Provisional application No. 63/170,844, filed on Apr. 5, 2021.

(51) Int. Cl.
*G06F 18/21* (2023.01)
*G06F 18/214* (2023.01)
(Continued)

(52) U.S. Cl.
CPC ...... *G06F 18/2185* (2023.01); *G06F 18/2148* (2023.01); *G06N 20/20* (2019.01); *G06Q 40/03* (2023.01)

(58) Field of Classification Search
CPC .. G06F 18/2185; G06F 18/00; G06F 18/2148; G06N 20/20; G06N 20/00;
(Continued)

(56) References Cited

U.S. PATENT DOCUMENTS 10,475,125 B1 * 11/2019 Kumari .................. G06N 20/00
10,762,563 B2 * 9/2020 Belanger ................ G06N 3/044
(Continued)

OTHER PUBLICATIONS

Sharma, Shakshi, and Rajesh Sharma. "Forecasting transactional amount in bitcoin network using temporal gnn approach." 2020 IEEE/ACM International Conference on Advances in Social Networks Analysis and Mining (ASONAM). IEEE, 2020. (Year: 2020).*
(Continued)

*Primary Examiner* — Randall K. Baldwin
(74) *Attorney, Agent, or Firm* — NIXON PEABODY LLP

(57) ABSTRACT

The disclosed embodiments include computer-implemented systems and methods that predicts targeted, agency-specific recovery events using a trained machine-learning or artificial-intelligence processes. For example, an apparatus may generate an input dataset based on elements of interaction data associated with an occurrence of a first event. Based on an application of a trained artificial intelligence process to the input dataset, the apparatus may generate elements of output data indicative of an expected occurrence of a corresponding one of a plurality of targeted second events involving each of a plurality of candidate event assignments during a future temporal interval. The apparatus may transmit at least a portion of the generated output data to a computing system via the communications interface, the computing system may perform operations that assign the first event to a corresponding one of the candidate event assignments based on the elements of output data.

19 Claims, 8 Drawing Sheets

(51) Int. Cl.
*G06N 20/20* (2019.01)
*G06Q 40/03* (2023.01)

(58) Field of Classification Search
CPC G06N 5/01; G06N 5/00; G06Q 40/03; G06Q 40/00; G06Q 40/025; G06K 9/6257; G06K 9/6264
See application file for complete search history.

(56) References Cited

U.S. PATENT DOCUMENTS

| | | | | |
|---|---|---|---|---|
| 10,937,089 | B2 * | 3/2021 | Nandan | G06N 20/00 |
| 11,188,940 | B1 * | 11/2021 | Vanderveld | G06Q 30/0255 |
| 2007/0156557 | A1 * | 7/2007 | Shao | G06Q 40/00<br>705/35 |
| 2018/0075367 | A1 * | 3/2018 | Yates | G06N 20/00 |
| 2019/0318293 | A1 | 10/2019 | Neuweg et al. | |
| 2019/0318421 | A1 * | 10/2019 | Lyonnet | G06N 20/20 |
| 2022/0207606 | A1 * | 6/2022 | Dickie | G06N 20/20 |
| 2022/0277227 | A1 * | 9/2022 | Yu | G06Q 40/08 |

OTHER PUBLICATIONS

Dhieb, Najmeddine, et al. "A secure ai-driven architecture for automated insurance systems: Fraud detection and risk measurement." IEEE access 8 (2020): 58546-58558. (Year: 2020).*

Abe et al., "Optimizing debt collections using constrained reinforcement learning," 16th ACM SIGKDD International conference on Knowledge discovery and data mining, pp. 75-64 (2010).

A copy of an International Search Report and Written Opinion mailed by the Canadian Intellectual Property Office in International Application No. PCT/CA/2022/050498 (8 pages).

* cited by examiner

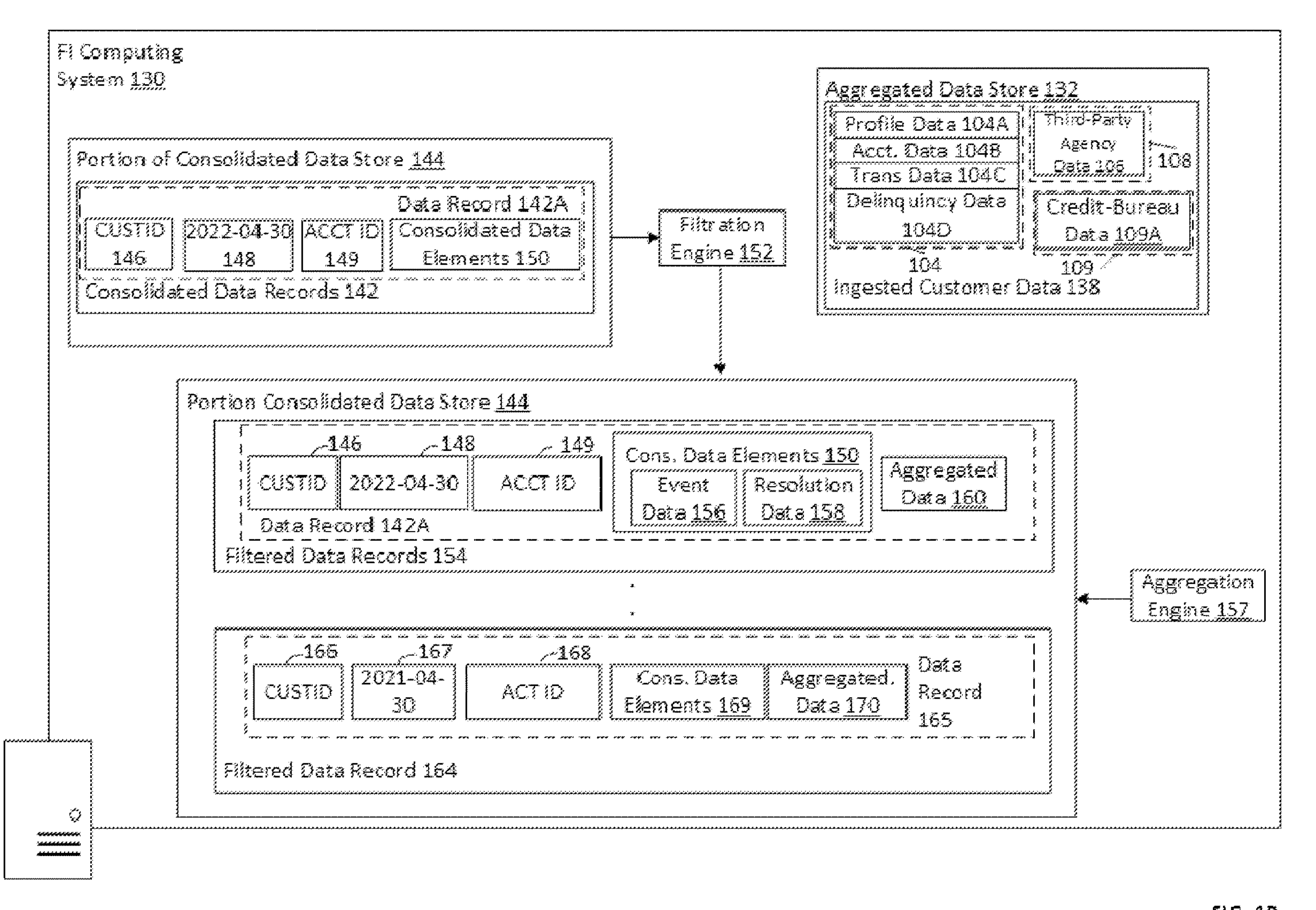
100
FI Computing System 130
Portion of Consolidated Data Store 144
Data Record 142A
CUSTID 146
2022-04-30 148
ACCT ID 149
Consolidated Data Elements 150
Consolidated Data Records 142
Filtration Engine 152
Aggregated Data Store 132
Profile Data 104A
Acct. Data 104B
Trans Data 104C
Delinquincy Data 104D
Third-Party Agency Data 106
108
Credit-Bureau Data 109A
104
109
Ingested Customer Data 138
Portion Consolidated Data Store 144
146
148
149
CUSTID
2022-04-30
ACCT ID
Cons. Data Elements 150
Event Data 156
Resolution Data 158
Aggregated Data 160
Data Record 142A
Filtered Data Records 154
Aggregation Engine 157
166
167
168
CUSTID
2021-04-30
ACT ID
Cons. Data Elements 169
Aggregated. Data 170
Data Record 165
Filtered Data Record 164
FIG. 1B

PREDICTING TARGETED, AGENCY-SPECIFIC RECOVERY EVENTS USING TRAINED ARTIFICIAL INTELLIGENCE PROCESSES

CROSS-REFERENCE TO RELATED APPLICATION

This application claims the benefit of priority under 35 U.S.C. § 119(e) to prior U.S. Provisional Application No. 63/170,844, filed Apr. 5, 2021, the disclosure of which is incorporated by reference herein to its entirety.

TECHNICAL FIELD

The disclosed embodiments generally relate to computer-implemented systems and processes that facilitate a prediction of targeted, agency-specific recovery events using adaptively trained artificial intelligence processes.

BACKGROUND

Financial institutions often issue unsecured credit products to their business customers, such as credit card accounts, personal loans, or unsecured lines-of-credit. To mitigate losses from delinquencies associated with these unsecured credit products, many of these financial institutions identify, and apply remediation processes to, business customers that exhibit signs of financial distress based on, among other things, experienced job losses, depleted assets, or failure to pay any portions of principal balances over extended time periods.

SUMMARY

In some examples, an apparatus includes a memory storing instructions, a communications interface, and at least one processor coupled to the memory and the communications interface. The at least one processor is configured to execute the instructions to generate an input dataset based on elements of interaction data associated with an occurrence of a first event. The at least one processor is also configured to, based on an application of a trained artificial intelligence process to the input dataset, generate elements of output data indicative of an expected occurrence of a corresponding one of a plurality of targeted second events involving each of a plurality of candidate event assignments during a future temporal interval. The at least one processor is configured to, transmit at least a portion of the generated output data to a computing system via the communications interface, and computing system is configured to perform operations that assign the first event to a corresponding one of the candidate event assignments based on the elements of output data.

In other examples, a computer-implemented method includes generating, using at least one processor, an input dataset based on elements of interaction data associated with an occurrence of a first event. The computer-implemented method also includes, based on an application of a trained artificial intelligence process to the input dataset, generating, using the at least one processor, elements of output data indicative of an expected occurrence of a corresponding one of a plurality of targeted second events involving each of a plurality of candidate event assignments during a future temporal interval. The computer-implemented method includes transmitting, using the at least one processor, at least a portion of the generated output data to a computing system, and the computing system is configured to perform operations that assign the first event to a corresponding one of the candidate event assignments based on the elements of output data.

Further, in some examples, a tangible, non-transitory computer-readable medium stores instructions that, when executed by at least one processor, cause the at least one processor to perform a method that includes generating an input dataset based on elements of interaction data associated with an occurrence of a first event. The method also includes, based on an application of a trained artificial intelligence process to the input dataset, generating elements of output data indicative of an expected occurrence of a corresponding one of a plurality of targeted second events involving each of a plurality of candidate event assignments during a future temporal interval. The method includes transmitting at least a portion of the generated output data to a computing system, and the computing system is configured to perform operations that assign the first event to a corresponding one of the candidate event assignments based on the elements of output data.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1A, 1B, and 1C are block diagrams illustrating portions of an exemplary computing environment, in accordance with some exemplary embodiments;

Like reference numbers and designations in the various drawings indicate like elements.

DETAILED DESCRIPTION

Figure 1A:
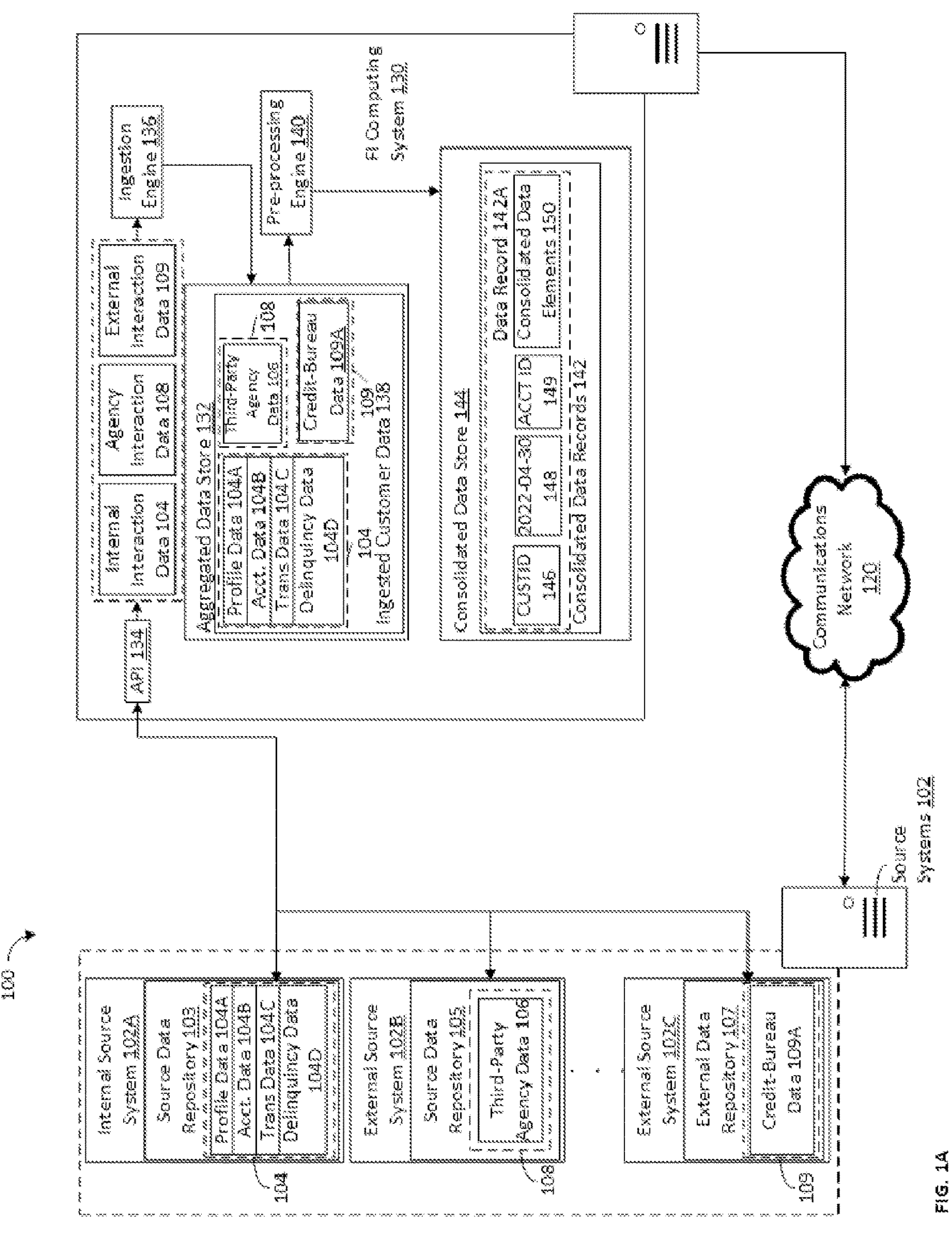

Modern financial institutions offer a variety of financial products or services to their customers, both through in-person branch banking and through various digital channels, and decisions related to the provisioning of a particular financial product or service to a corresponding customer are often informed by the customer's relationship with the financial institution and the customer's use, or misuse, of other financial products or services. For example, one or more computing systems of a financial institution may obtain, generate, and maintain elements of customer profile data identifying the customer and characterizing the customer's relationship with the financial institution, elements of account data identifying and characterizing one or more financial products issued to the customer by the financial institution, elements of transaction data identifying and characterizing one or more transactions involving these issued financial products, or elements of reporting data, such as credit-bureau data associated with the particular customer. The elements of customer profile data, account data, transaction data, and/or reporting data may establish collectively a time-evolving risk profile for the customer, and the financial institution may base not only a decision to provision the particular financial product or service to the corresponding customer on the established risk profile.

In some instances, upon issuance of the financial product to the customer, the financial institution may assume the risk that the customer, at some point in the future, may be unable to submit, or may delay a submission of, one or more scheduled payments associated with the financial product to the financial institution, and as such, that the issued financial product may accrue a past-due balance that increases with delayed, or missed, scheduled payments. The inability to satisfy the obligations associated with the financial product, e.g., in accordance with one or more initial terms and conditions, may result in, or may represent, an occurrence of a delinquency event involving the customer and the financial product. By way of example, and for the customer holding the financial product, a delinquency event involving the customer and the credit-card account may occur when the past-due balance exceeds a predetermined threshold balance and is associated with a corresponding past-due period (e.g., as defined by the number of scheduled payments missed, or delayed, by the customer) that exceeds a predetermined a threshold time period (e.g., sixty days, etc.).

By way of example, the delinquency event may represent an early-stage delinquency event characterized by a corresponding past-due period that fails to exceed a predetermined threshold period (e.g., characterized by a single, missed monthly payment, etc.), and the financial institution may apply one or more internal treatment processes to the financial product or the corresponding customer involved in the early-stage delinquency event. Examples of these internal treatment processes may include, but not limited to, a voice-based, paper-based, or electronic communication initiated between the financial institution and the customer involved in the early-stage delinquency event, e.g., by a representative of the financial institution. In other examples, the delinquency event may represent a late-stage delinquency event associated with multiple, missed monthly payments and a corresponding past-due period that exceeds the predetermined threshold period. As described herein, and responsive of the occurrence of the late-stage delinquency event, the financial institution may elect to terminate the application of any further internal treatment processes, and may assign the financial product (and the corresponding customer) involved in the late-stage delinquency event to one, or more, third-party collections agency unrelated to the financial institution, which may perform operations that attempt to recover all, or at least a portion of the past-due balance during corresponding assignment periods.

Today, the initial assignment of the unsecured credit product to a third-party collections agency for recovery of an initial portion of past-due balance, and any subsequent re-assignments of the unsecured credit product to a third-party collections agency for recovery of a remaining portion of past-due balance, often represents a subjective process guided by the intuition of a representative of the financial institution or by that representative's experiences, and prior successes, in assigning particular types of delinquent financial products having corresponding past-due balances or past-due periods to particular third-party collections agencies. These often-subjective assignment processes may, however, be incapable of leveraging the corpus of customer profile data, account data, transaction data, and/or reporting data characterizing the customers of the financial institution and the interaction of these customers with the financial institution, with other financial institutions, or with various financial products. Further, these subject processes are also often incapable of leveraging time-varying elements of data characterizing a performance of one or more third-party collections agencies in recovering past-due balances associated with various types of financial products, much less of determining, or acting upon, one or more customer-, product-, or delinquency specific trends within these elements of performance data.

In other examples, described herein, the one or more computing systems of the financial institution may perform operations that train adaptively a machine-learning or artificial-intelligence process to predict, for each of a plurality of candidate third-party collections agencies, an expected occurrence of one of a plurality of targeted classes of recovery events involving a delinquent financial product held by a customer of the financial institution during a future temporal using training datasets associated with a first prior temporal interval (e.g., a "training" interval), and using validation datasets associated with a second, and distinct, prior temporal interval (e.g., an out-of-time "validation" interval). As described herein, machine-learning or artificial-intelligence process may include an ensemble or decision-tree process, such as a gradient-boosted decision-tree process (e.g., the XGBoost process), and the training and validation datasets may include, but are not limited to, values of adaptively selected features obtained, extracted, or derived from elements of customer profile data, account data, transaction data, delinquency data, agency performance data, and/or reporting data maintained by the computing systems of the financial institution.

In some instances, the adaptively trained machine learning or artificial intelligence process (e.g., the trained XGBoost process described herein) may operate as a multiple-target classification process that, when applied to an input data set associated with the delinquent financial product (and the customer), assigns each of the candidate third-party collections agencies to a corresponding one of a plurality of targeted classes of recovery events involving the delinquent financial product. By way of example, the plurality of targeted classes of recovery events may include, among other things, (ii) a first targeted recovery class indicative of a predicted likelihood that a corresponding one of the third-party collections agencies will fail to recovery any portion of the past-due amount during the temporal assignment period (e.g., a "no-recovery" class); (ii) a second targeted recovery class indicative of a predicted likelihood that a corresponding one of the third-party collections agencies will recover between less that a first threshold percentage of the past-due amount during the temporal assignment period (e.g., a "low-recovery" class); (iii) a third targeted recovery class indicative of a predicted likelihood that a corresponding one of the third-party collections agencies will recover between the first threshold percentage and a second threshold percentage of the past-due amount during the temporal assignment period (e.g., a "medium-recovery" class); and (iv) a fourth targeted recovery class indicative of a predicted likelihood that a corresponding one of the third-party collections agencies will recover greater than the second threshold percentage of the past-due amount during the temporal assignment period (e.g., a "high-recovery" class).

Upon application of the trained gradient-boosted, decision-tree process to the input dataset associated with the customer of the financial institution, the distributed computing components of FI computing system 130 may perform any of the exemplary processes described herein to generate an element of output data that includes a unique identifier of the corresponding targeted recovery class associated with each of candidate third-party collections agencies, which indicates, for each of the candidate third-party collections agencies, a corresponding, expected recovery rate of the past-due balance associated with the delinquent financial product during the temporal assignment period. Further, one or more computing systems of the financial institution may perform operations, described herein, to assign the delinquent financial product, and the past-due balance, to a corresponding one of the predetermined plurality of third-party collections agencies based on the expected rates of recovery.

Certain of these exemplary processes, which predict, in real-time, a rate of recovery for each of a plurality of third-party collection agencies during a future temporal interval based on an application of a trained machine learning or artificial intelligence process to an input dataset characterizing a delinquent financial product, and which enable the financial institution to assign the delinquent financial product to a corresponding one of the third-party collection agencies during a temporal assignment period based on the predicted recovery rates, may be implemented in addition to, or as an alternate to, many existing, subjective assignment processes that rely on an experience or an intuition of a representative of a financial institution.

Figure 1C:
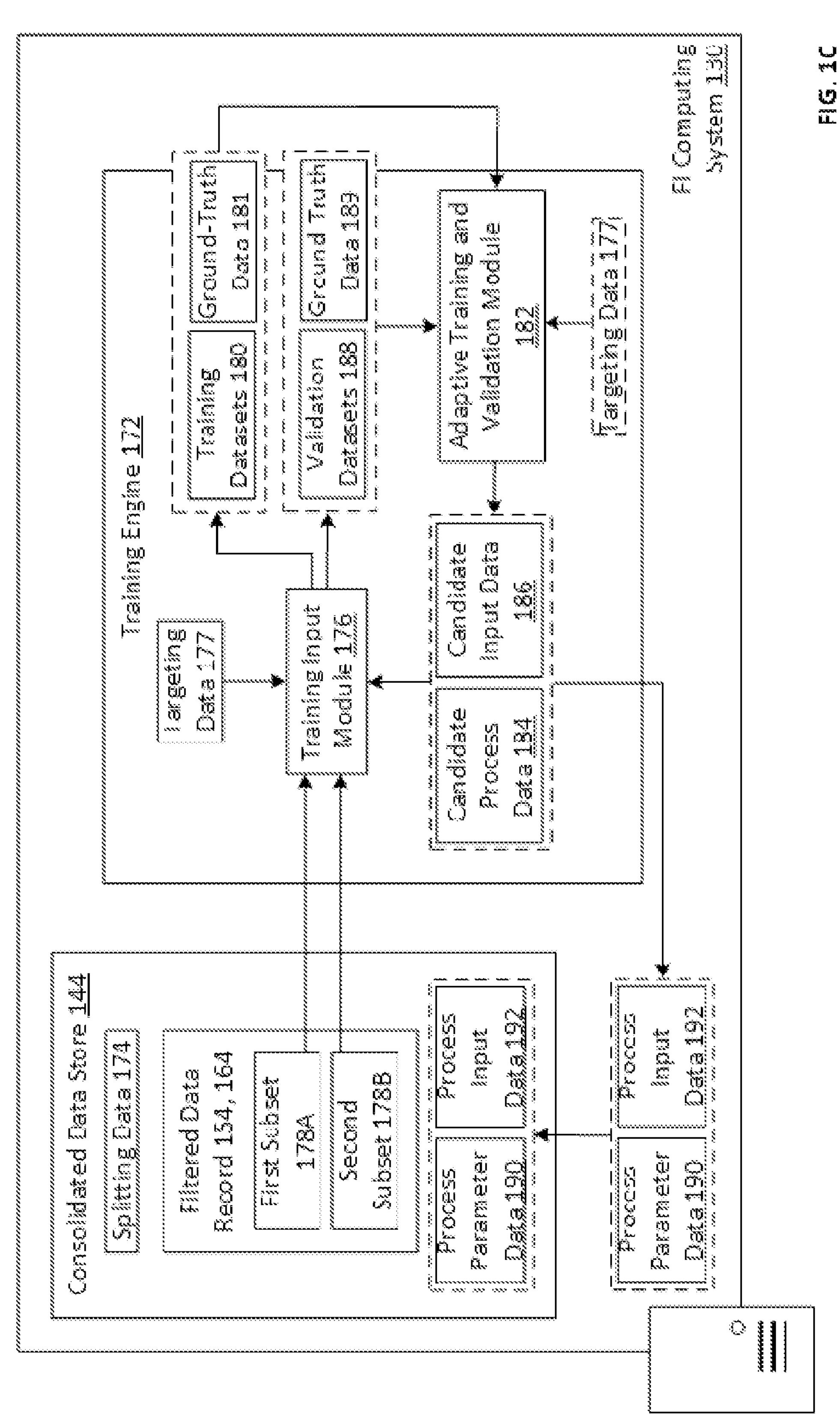

A. Exemplary Processes for Adaptively Training Gradient-Boosted, Decision Tree Processes in a Distributed Computing Environment FIGS. 1A, 1B, and 1C illustrate components of an exemplary computing environment 100, in accordance with some exemplary embodiments. For example, as illustrated in FIG. 1A, environment 100 may include one or more source systems 102, such as, but not limited to, internal source system 102A, external source system 102B, and external source system 102C and one or more computing systems associated with, or operated by, a financial institution, such as financial institution (FI) computing system 130. In some instances, each of source systems 102 (including internal source system 102A, external source system 102B, and external source system 102C) and FI computing system 130 may be interconnected through one or more communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 102 (including internal source system 102A, external source system 102B, and external source system 102C) and FI computing system 130 may represent a computing system that includes one or more servers and tangible, non-transitory memories storing executable code and application modules. The one or more servers may each include one or more processors, which may be configured to execute portions of the stored executable code or application modules to perform operations consistent with the disclosed embodiments, and examples of the one or more processors may include, but are not limited to, a central processing unit (CPU) capable of processing a single operation (e.g., a scalar operations) in a single clock cycle. Further, each of source systems 102 (including internal source system 102A, external source system 102B, and external source system 102C) and FI computing system 130 may also include a communications interface, such as one or more wireless transceivers, coupled to the one or more processors for accommodating wired or wireless internet communication with other computing systems and devices operating within environment 100, e.g., via network 120.

Further, in some instances, source systems 102 (including internal source system 102A, external source system 102B, and external source system 102C) and FI computing system 130 may each be incorporated into a respective, discrete computing system. In additional, or alternate, instances, one or more of source systems 102 (including internal source system 102A, external source system 102B, and external source system 102C) and FI computing system 130 may correspond to a distributed computing system having a plurality of interconnected, computing components distributed across an appropriate computing network, such as network 120. For example, FI computing system 130 may correspond to a distributed or cloud-based computing cluster associated with, and maintained by, the financial institution, although in other examples, FI computing system 130 may correspond to a publicly accessible, distributed or cloud-based computing cluster, such as a computing cluster maintained by Microsoft Azure™ Amazon Web Services™, Google Cloud™, or another third-party provider.

In some instances, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of one or more of these exemplary, parallelized, fault-tolerant distributed computing and analytical protocols, the distributed computing components of FI computing system 130 may perform in parallel any of the exemplary processes described herein to ingest elements of data, to preprocess the ingested data elements by filtering, aggregating, up-sampling, or down-sampling certain portions of the ingested data elements, and to store the preprocessed data elements within an accessible data repository (e.g., within a portion of a distributed file system, such as a Hadoop distributed file system (HDFS)).

Further, and through an implementation of the parallelized, fault-tolerant distributed computing and analytical protocols described herein, the distributed components of FI computing system 130 may also perform operations in parallel that not only train adaptively a machine learning or artificial intelligence process (e.g., the gradient-boosted, decision-tree process (e.g., the XGBoost model) described herein) using corresponding training and validation datasets extracted from temporally distinct subsets of the preprocessed data elements, but also apply the adaptively trained machine learning or artificial intelligence process to input datasets associated with delinquent financial products and generate corresponding elements of product-specific output data. For example, each of the customer-specific input datasets may be associated with, and may characterize, a corresponding one of the customers of the financial institution and a delinquent, unsecured credit product held by the corresponding customer. Further, the elements of customer-specific output data may characterize, for each of the corresponding customers, a predicted, assignment-specific recovery rate associated with an assignment of the delinquent account to each of a plurality of third-party recovery agencies, and may classify each of the assignment-specific recovery rates in accordance with a predetermined set of target recovery-rate classes (e.g., no recovery, low recovery, medium recovery, or high recovery). In some instances, the implementation of the parallelized, fault-tolerant distributed computing and analytical protocols described herein across the one or more GPUs or TPUs included within the distributed components of FI computing system 130 may, in some instances, accelerate the training, and the post-training deployment, of the machine-learning and artificial-intelligence process when compared to a training and deployment of the machine-learning and artificial-intelligence process across comparable clusters of CPUs capable of processing a single operation per clock cycle.

Referring back to FIG. 1A, each of source systems 102 may maintain, within corresponding tangible, non-transitory memories, a data repository that includes elements of confidential data associated with the business customers of the financial institution. For example, internal source system 102A may be associated with, or operated by, the financial institution, and may maintain, within the corresponding one or more tangible, non-transitory memories, a source data repository 103 that includes one or more elements of internal interaction data 104. In some instances, internal interaction data 104 may include data that identifies or characterizes one or more customers of the financial institution and interactions between these customers, between the customers and the financial institution, and/or between the customers and other financial institutions or unrelated third parties. As illustrated in FIG. 1A, examples of the elements of confidential data include, but are not limited to, customer profile data 104A, account data 104B, transaction data 104C and/or delinquency data 104D.

In some instances, customer profile data 104A may include a plurality of data records associated with, and characterizing, corresponding ones of the customers of the financial institution. By way of example, and for a particular customer of the financial institution, the data records of customer profile data 104A may include, but are not limited to, one or more unique customer identifiers (e.g., an alphanumeric character string, such as a login credential, a customer name, etc.), residence data (e.g., a street address, etc.), other elements of contact data (e.g., a mobile number, an email address, etc.), values of demographic parameters that characterize the particular customer (e.g., ages, occupations, marital status, etc.), and other data characterizing the relationship between the particular customer and the financial institution. Further, customer profile data 104A may also include, for the business customer, multiple data records that include corresponding elements of temporal data (e.g., a time or date stamp, etc.), and the multiple data records may establish, for the particular customer, a temporal evolution in the customer residence or a temporal evolution in one or more of the demographic parameter values.

Account data 104B may also include a plurality of data records that identify and characterize one or more financial products or financial instruments issued by the financial institution to corresponding ones of the customers. For example, the data records of account data 104B may include, for each of the financial products issued to corresponding ones of the customers, one or more identifiers of the financial product or instrument (e.g., an account number, expiration data, card-security-code, etc.), one or more unique customer identifiers (e.g., an alphanumeric character string, such as a login credential, a customer name, etc.), information identifying a product type that characterizes the issued financial product or instrument, and additional information characterizing a balance or current status of the financial product or instrument (e.g., payment due dates or amounts, delinquent accounts statuses, etc.).

Examples of these financial products or financial instruments may include, but are not limited to, one or more deposit accounts issued to corresponding ones of the customers (e.g., a savings account, a checking account, etc.), one or more brokerage or retirements accounts issued to corresponding ones of the customers by the financial institutions, and one or more secured credit products issued to corresponding ones of the customers by the financial institution. The financial products or financial instruments may also include one or more unsecured credit products issued to corresponding ones of the customers by the financial institution, and as described herein, examples of these unsecured credit products may include, but are not limited to, a personal or business credit-card account, a personal loan, an unsecured line-of-credit, or a personal or business overdraft protection (ODP) product.

Further, transaction data 104C may include data records that identify, and characterize one or more initiated, settled, or cleared transactions involving respective ones of the customers and corresponding ones of the issued financial products, including the unsecured credit products described herein. Examples of these transactions include, but are not limited to, purchase transactions, bill-payment transactions, electronic funds transfers, currency conversions, purchases of securities, derivatives, or other tradeable instruments, electronic funds transfer (EFT) transactions, peer-to-peer (P2P) transfers or transactions, or real-time payment (RTP) transactions. For instance, and for a particular transaction involving a corresponding customer and corresponding financial product, the data records of transaction data 104C may include, but are limited to, a unique customer identifier associated with the corresponding business customer (e.g., the alphanumeric character string described herein, etc.), a counterparty identifier associated with a counterparty to the particular transaction (e.g., an alphanumeric character string, a counterparty name, etc.), an identifier of the corresponding financial product (e.g., a tokenized account number, expiration data, card-security-code, etc.), and values of one or more parameters of the particular transaction (e.g., a transaction amount, a transaction date, etc.).

In some instances, delinquency data 104D may include data records that identify and characterize occurrences of prior delinquency events involving customers of the financial institution and corresponding financial products issued by the financial institution, such as, but not limited to, the unsecured credit products described herein. By way of example, each of the data records of delinquency data 104D may associated with a corresponding occurrence of a delinquency event, and may include, for the corresponding occurrence of the delinquency event, a unique identifier of a customer involved in the delinquency event (e.g., an alphanumeric customer identifier, a customer name, etc.), information identifying the delinquent financial product (e.g., a corresponding product type, a corresponding portion of a tokenized account number, etc.), temporal data characterizing of the corresponding occurrence of the delinquency event (e.g., a due date of a missed payment scheduled for an unsecured credit product, such as a credit-card account, etc.), and additionally, or alternatively, data characterizing an initial scope of the corresponding occurrence of the delinquency event, such as a past-due balance and a past-due period (e.g., a temporal interval between a current date and the due date of the missed payment).

Further, and for the corresponding occurrence of the delinquency, each of the data records of delinquency data 104D may also include elements of resolution data that identify and characterize one or more treatment processes applied by the financial institution to the corresponding occurrence of the delinquency event, e.g., in an effort to resolve the delinquency event or recover at least a portion of the past-due balance. By way of example, the delinquency event may represent an early-stage delinquency event characterized by a corresponding past-due period that fails to exceed a predetermined threshold period (e.g., characterized by a single, missed monthly payment, etc.), and the financial institution may apply one or more internal treatment processes to the involved financial product or the corresponding customer involved in the early-stage delinquency event, such as those described herein.

In other examples, the delinquency event may represent a late-stage delinquency event associated with multiple, missed monthly payments and a corresponding past-due period that exceeds the predetermined threshold period. As described herein, and responsive of the occurrence of the late-stage delinquency event, the financial institution may elect to terminate the application of any further internal treatment processes, and may assign the financial product (and the corresponding customer) involved in the late-stage delinquency event to a third-party collections agency unrelated to the financial institution. The assignment of the delinquent financial product to the third-party collections agency (e.g., an “initial” assignment subsequent to the write-off the delinquent financial product by the financial institution) may be associated with a corresponding assignment period, such as, but not limited to, a temporal interval of up to 400 calendar days.

During the initial assignment period, the assigned, third-party collection agency may perform operations, such as voice-based or digital communications with the customer, in an effort to recovery all, or at least a portion, of the past-due balance associated with delinquent financial product (e.g., including a principal amount, an amount of accrued interest, and/or any imposed fees), and upon completion of the initial assignment period, a performance of the initially assigned third-party collection agency in recovering the past-due balance may be characterized by, among other things, a corresponding rate of recovery (e.g., a percentage or fraction of the past-due balance recovered during the initial assignment period) and a degree of interaction between the initially assigned third-party collection agency (e.g., a volume of telephone calls between the assigned third-party collection agency and the customer associated with the delinquent financial product, a number or value of customer-initiated and -fulfilled payment promises, etc.).

By way of example, and based on the rate of recovery of the past-due balance assignment period of the initial assignment, the financial system may elect to re-assign the delinquent financial product, and any remaining past-due balance (e.g., a remaining portion of the principal amount, additional accrued interest and/or imposed fees, etc.) to the third-party collections agency, or to an additional, or alternate, third-party collections agency, during a subsequent, second assignment period. The second assignment period may, for example, correspond to a temporal interval of up to 400 additional calendar days, and during the second assignment period, the subsequently assigned third-party collections agency (e.g., the initially assigned third-party collections agency, or the additional or alternate third-party collections agency) may perform any of the exemplary processes described herein to recover at least an additional portion of the remaining past-due amount. The performance of the subsequently assigned third-party collection agency in recovering the remaining past-due balance during the second assignment period may be characterized by, among other things, a corresponding rate of recovery and a degree of interaction between the initially assigned third-party collection agency.

In some instances, the subsequently assigned, third-party collections agency may recover fully the remaining past-due balance associated with the delinquent financial product. In other instances, the subsequently assigned, third-party collections agency may fail to recover fully the remaining past-due balance associated with the delinquent financial product, and the financial institution, and the financial institution may elect to assign any additional remaining past-due balance (e.g., a remaining portion of the principal amount, additional accrued interest and/or imposed fees, etc.) to an additional, or alternate, third-party collections agency, during a subsequent, third assignment period of up to four-hundred days. Further, upon completion of the third assignment period, the financial institution may continue to assign the delinquent financial product, and any remaining past-due balance, to additional third-party collection agencies for corresponding assignment periods until a full recovery of the remaining past-due balance, or until the financial institution elects to write off the remaining past-due balance or transfer permanently the collections of the remaining, past-due balance to one of the third-party collection agencies, e.g., to collect an agreed-upon portion of the remaining, past-due balance upon transfer.

In some instances, the elements of resolution data that characterize the initial assignment of the delinquent financial product to a corresponding, third-party collections agency, and each of the subsequently assignments of the delinquent financial product to a corresponding third-party agency may include, but are not limited to, an identifier of the delinquent financial product (e.g., the tokenized account number described herein), an identifier of the corresponding, third-party collections agency (e.g., an alphanumeric identifier assigned by the financial institution), an assignment time or date associated with the initial, or subsequent, assignment of the delinquent financial product to the corresponding third-party collections agency, data characterizing a temporal assignment period associated with the initial, or subsequent assignment (e.g., four-hundred days, etc.), and sequence data characterizing a position of the initial, or subsequent, assignment within an assignment lifecycle (e.g., an initial assignment, a second or third assignment, a subsequent assignment, etc.). Further, the elements of resolution data that characterize the initial, or subsequent, assignment of the delinquent financial product to the corresponding, third-party collections agency may also include the past-due balance associated with the delinquent financial product (e.g., all, or a portion, of the initial principal balance, any imposed fees or accrued interest, etc.), and data characterizing a performance of the corresponding, third-party collection agency during the initial or subsequent, assignment period, such as, but not limited to, a recovery rate of the assigned past-due balance (e.g., a percentage of that assigned past-due balance, etc.) and values of metrics characterizing an interaction between the customer and the corresponding, third-party collections agency (e.g., a number calls to the customer associated with the delinquent financial product during the assignment period, etc.).

The disclosed embodiments are, however, not limited to these exemplary elements of customer profile data 104A, account data 104B, transaction data 104C, and delinquency data 104D. In other instances, the data records of internal interaction data 104 may include any additional, or alternate, elements of data that identify and characterize the customers of the financial institution and their relationships or interactions with the financial institution, the financial products issued to these customers by the financial institution, the transactions involving respective ones of the customers and corresponding ones of the issued financial products or instruments described herein, and the occurrences of the prior delinquency events associated with the customers and financial products. Further, although stored in FIG. 1A within data repositories maintained by internal source system 102A, the exemplary elements of customer profile data 104A, account data 104B, transaction data 104C, and delinquency data 104D may be maintained by any additional or alternate computing system associated with the financial institution, including, but not limited to, within one or more tangible, non-transitory memories of FI computing system 130.

Further, as illustrated in FIG. 1A, external source system 102B may also be associated with, or operated by, a third-party vendor, and maintain a source data repository 105 that includes elements of third-party agency data 106. In some examples, the data records of third-party agency data 106 that identify and characterize one or more third-party collections agencies that receive assignments of delinquent financial products, and corresponding past-due balances, from the financial institution across one of more prior temporal intervals. By way of example, and for a corresponding one of the third-party collections agencies, the elements of third-party agency data 106 may include, but are not limited to, the identifier of the corresponding, third-party collections agency (e.g., an alphanumeric identifier described herein), assignment data characterizing, on an aggregated or time-averaged basis, assignments of delinquent financial products to the corresponding third-party collections agency during the one or more prior temporal intervals, and performance data characterizing, on an aggregated or a time-averaged basis, a performance of the corresponding third-party collections agency in recovering the past-due amounts associated with the assigned, delinquent financial products during the one or more temporal intervals.

In some instances, the assignment data may include, among other things, a total or time-averaged number of assignments of delinquent financial products to the corresponding, third-party collections agency during the one or more prior temporal intervals, and the performance data may include, among other things, a total or time averaged amount of funds recovered from the delinquent financial products, a time-averaged rate of recovery of the past-due balances associated with these delinquent financial products, and/or values of metrics characterizing the interactions between the corresponding, third-party collection agencies and respective ones of the customers during the one or more prior temporal intervals, such as a time-averaged number of calls per assigned delinquent financial product.

Further, the elements of assignment data or performance data may be parameterized on based on a product type of the assigned delinquent financial products, ranges of past-due balances associated with the assigned, delinquent financial products, and/or a sequential position of the assigned, delinquent financial products within the assignment lifecycle (e.g., an initial assignment, a second or third assignment, a subsequent assignment, etc.). The disclosed embodiments are, however, not limited to these exemplary elements of third-party agency data, and in other instances, the elements of third-party agency data 106 may include any additional, or alternate, information that identifies and characterizes the one or more third-party collections agencies or the receive assignments of delinquent financial products, and corresponding past-due balances, across the one of more prior temporal intervals, and may be maintained in any additional, or alternate, one of source systems 102 or FI computing system 130.

External source system 102C may be associated with, or operated by, one or more judicial, regulatory, governmental, or reporting entities external to, and unrelated to, the financial institution, and external source system 102C. In some instances, external source system 102C may be associated with, or operated by, a reporting entity, such as a credit bureau, and may maintain, within the corresponding one or more tangible, non-transitory memories, a source data repository 107 that includes credit-bureau data 109A associated with one or more business customers of the financial institution. In some instances, the elements of credit-bureau data 109A for a particular one of the business customers of the financial institution may include, but are not limited to, a unique identifier of the particular customer (e.g., an alphanumeric identifier or login credential, a customer name, etc.), information identifying a current or prior credit rating, information identifying one or more financial products currently or previously held by the particular customer (e.g., one or more of the unsecured credit products described herein, financial products issued by other financial institutions), information identifying a history of payments associated with these financial products, information identifying negative events associated with the particular customer (e.g., missed payments, collections, repossessions, etc.), and information identifying one or more credit inquiries involving the particular customer (e.g., inquiries by the financial institution, other financial institutions or business entities, etc.).

In some instances, FI computing system 130 may perform operations that establish and maintain one or more centralized data repositories within a corresponding ones of the tangible, non-transitory memories. For example, as illustrated in FIG. 1A, FI computing system 130 may establish an aggregated data store 132, which maintains, among other things, elements of the customer profile, account, transaction, collections, third-party and credit-bureau data associated with one or more of the business customers of the financial institution, which may be ingested by FI computing system 130 (e.g., from one or more of source systems 102) using any of the exemplary processes described herein. Aggregated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 102, including internal source system 102A, external source system 102B, and external source system 102C, across network 120, and may perform operations that access and obtain all, or a selected portion, of the elements of customer profile, account, transaction, collections, third-party agency and/or credit-bureau data maintained by corresponding ones of source systems 102. As illustrated in FIG. 1A, internal source system 102A may perform operations that obtain all, or a selected portion, of internal interaction data 104, including the data records of customer profile data 104A, account data 104B, transaction data 104C, and delinquency data 104D, from source data repository 103, and transmit the obtained portions of internal interaction data 104 across network 120 to FI computing system 130. Further, external source system 1026 may also perform operations that obtain all, or a selected portion, of agency interaction data 108, including the data records of third-party agency data 106, from source data repository 105, and transmit the obtained portions of third-party agency data 106 across network 120 to FI computing system 130. Additionally, in some instances, external source system 102C may also perform operations that obtain all, or a selected portion, of external interaction data 109, including the data records of credit-bureau data 109A, from source data repository 107, and transmit the obtained portions of external interaction data 109 across network 120 to FI computing system 130.

In some instances, and prior to transmission across network 120 to FI computing system 130, internal source system 102A, external source system 102B, and external source system 102C may encrypt respective portions of internal interaction data 104 (including the data records of customer profile data 104A, account data 104B, transaction data 104C, and delinquency data 104D), agency interaction data 108 (including the data records of third-party agency data 106), and external interaction data 109 (including the data records of credit-bureau data 109A) using a corresponding encryption key, such as, but not limited to, a corresponding public cryptographic key associated with FI computing system 130. Further, although not illustrated in FIG. 1A, each of source systems 102 may perform any of the exemplary processes described herein to obtain, encrypt, and transmit additional, or alternate, portions of the locally maintained customer profile, account, transaction, delinquency, third-party agency, or credit-bureau data maintained across network 120 to FI computing system 130.

A programmatic interface established and maintained by FI computing system 130, such as application programming interface (API) 134, may receive the portions of internal interaction data 104 (including the data records of customer profile data 104A, account data 104B, transaction data 104C, and delinquency data 104D) from internal source system 102A, agency interaction data 108 (including the data records of third-party agency data 106) from external source system 102B, and external interaction data 109 (including the data records of credit-bureau data 109A) from external source system 102C. As illustrated in FIG. 1A, API 134 may route the portions of internal interaction data 104, agency interaction data 108, and external interaction data 109 to a data ingestion engine 136 executed by the one or more processors of FI computing system 130. As described herein, the portions of internal interaction data 104, agency interaction data 108, and external interaction data 109 (and the additional, or alternate, portions of the customer profile, account, transaction, delinquency, third-party agency or reporting data obtained or received from any additional, or alternate ones of source systems 102)) may be encrypted, and executed data ingestion engine 136 may perform operations that decrypt each of the encrypted portions of internal interaction data 104, third-party agency data 106, and external interaction data 109 (and the additional, or alternate, portions of the customer profile, account, transaction, collections, or reporting data) using a corresponding decryption key, e.g., a private cryptographic key associated with FI computing system 130.

Executed data ingestion engine 136 may also perform operations that store the portions of internal interaction data 104 (including the data records of customer profile data 104A, account data 104B, transaction data 104C, and delinquency data 104D), agency interaction data 108 (including the data records of third-party agency data 106), and external interaction data 109 (including the data records of credit-bureau data 109A) within aggregated data store 132, e.g., as ingested customer data 138. As illustrated in FIG. 1A, a pre-processing engine 140 executed by the one or more processors of FI computing system 130 may access the elements of ingested customer data 138, and perform any of the exemplary data-processing operations described herein to preprocess the accessed elements of ingested customer data 138 and to generate consolidated data records 142 that characterize corresponding ones of the customers of the financial institution, their interactions with the financial institution and with other financial institutions, and any occurrences of delinquency events involving corresponding delinquent financial products, past-due balances, and internal or external treatment processes applied to the delinquent financial products and past-due balances, during a temporal interval associated with the ingestion of internal interaction data 104, third-party agency data 106, and external interaction data 109.

By way of example, executed pre-processing engine 140 may access the data records of customer profile data 104A, account data 104B, transaction data 104C, and delinquency data 104D, third-party agency data 106, and/or credit-bureau data 109A (e.g., as maintained within ingested customer data 138). As described herein, each of the accessed data records may include an identifier of corresponding customer of the financial institution, such as a customer name or an alphanumeric character string, and executed pre-processing engine 140 may perform operations that map each of the accessed data records to a customer identifier assigned to the corresponding customer by FI computing system 130. By way of example, FI computing system 130 may assign a unique, alphanumeric customer identifier to each customer, and executed pre-processing engine 140 may perform operations that parse the accessed data records, identify each of the parsed data records that identifies the corresponding customer using a customer name, and replace that customer name with the corresponding alphanumeric customer identifier.

Executed pre-processing engine 140 may also perform operations that assign a temporal identifier to each of the accessed data records, and that augment each of the accessed data records to include the newly assigned temporal identifier. In some instances, the temporal identifier may associate each of the accessed data records with a corresponding temporal interval, which may be indicative of reflect a regularity or a frequency at which FI computing system 130 ingests the elements of internal interaction data 104, third-party agency data 106, and external interaction data 109. For example, executed data ingestion engine 136 may receive elements of confidential customer data from corresponding ones of source systems 102 on a monthly basis (e.g., on the final day of the month), and in particular, may receive and store the elements of internal interaction data 104, agency interaction data 108, and external interaction data 109 from corresponding ones of source systems 102 on Apr. 30, 2022. Executed pre-processing engine 140 may generate a temporal identifier associated with the regular, monthly ingestion of internal interaction data 104, portions of third-party agency data 106, and external interaction data 109 on Apr. 30, 2022 (e.g., "2022-04-30"), and may augment the accessed data records of customer profile data 104A, account data 104B, transaction data 104C, delinquency data 104D, third-party agency data 106, and/or credit-bureau data 109A to include the generated temporal identifier. The disclosed embodiments are, however, not limited to temporal identifiers reflective of a monthly ingestion, and in other instances, executed pre-processing engine 140 may augment the accessed data records to include temporal identifiers reflective of any additional, or alternative, temporal interval during which FI computing system 130 ingests the elements of internal interaction data 104, third-party agency data 106, and external interaction data 109.

In some instances, executed pre-processing engine 140 may perform further operations that, for a particular customer of the financial institution during the temporal interval (e.g., represented by a pair of the customer and temporal identifiers described herein), obtain one or more data records of customer profile data 104A, account data 104B, transaction data 104C, delinquency data 104D, third-party agency data 106, and credit-bureau data 109A that include the pair of customer and temporal identifiers. Executed pre-processing engine 140 may perform operations that consolidate the one or more obtained data records and generate a corresponding one of consolidated data records 142 that includes the customer identifier and temporal identifier, that is associated with a corresponding one of the financial products held by the particular customer during the temporal interval, and that is associated with, and characterizes, the particular customer of the financial institution, and the interaction of that particular customer with the corresponding financial product across the temporal interval.

By way of example, executed pre-processing engine 140 may consolidate the obtained data records, which include the pair of customer and temporal identifiers, through an invocation of an appropriate Java-based SQL "join" command (e.g., an appropriate "inner" or "outer" join command, etc.). Further, executed pre-processing engine 140 may perform any of the exemplary processes described herein to generate another one of consolidated data records 142 for each additional, or alternate, customer of the financial institution, and for each additional, or alternate, financial product held by the particular customer, during the temporal interval (e.g., as represented by a corresponding customer identifier and the temporal interval). In some instances, executed pre-processing engine 140 may perform operations that store each of consolidated data records 142 within one or more tangible, non-transitory memories of FI computing system 130, such as consolidated data store 144. Consolidated data store 144 may, for example, correspond to a data lake, a data warehouse, or another centralized repository established and maintained, respectively, by the distributed components of FI computing system 130, e.g., through a Hadoop™ distributed file system (HDFS).

In some instances, and as described herein, consolidated data records 142 may include a plurality of discrete data records, each of these discrete data records may be associated with, and may maintain data characterizing, a corresponding one of the customers of the financial institution that holds a corresponding financial product during the corresponding temporal interval (e.g., a month-long interval extending from Apr. 1, 2022, to Apr. 30, 2022). By way of example, and for a particular customer of the financial institution holding a particular financial product, discrete data record 142A of consolidated data records 142 may include a customer identifier 146 of the particular customer (e.g., an alphanumeric character string "CUSTID"), a temporal identifier 148 of a corresponding temporal interval (e.g., a numerical string "2022-04-30"), an account identifier 149 of the particular financial product (e.g., a portion of a tokenized account number, as described herein), and consolidated data elements 150 of customer profile, account, transaction, delinquency, third-party agency, or credit-bureau data that characterize the particular customer during the corresponding temporal interval. For instance, and as described herein, consolidated data elements 150 may include, among other things, elements obtained from, derived from, or aggregated based on one or more of the data records of customer profile data 104A, account data 104B, transaction data 104C, delinquency data 104D, third-party agency data 106, and/or credit-bureau data 109A ingested by FI computing system 130 on Apr. 30, 2022.

Further, in some examples, FI computing system 130 may perform operations that apply one or more filtration criteria to the data records of consolidated data records 142, e.g., to identify portions of these consolidated data records that are available to, and appropriate for, a generation of training or validation datasets using any of the exemplary processes described herein. Referring to FIG. 1B, a filtration engine 152 executed by the one or more processors of FI computing system 130 may access each of the data records of consolidated data records 142 maintained within consolidated data store 144 (e.g., discrete data record 142A, as described herein), and perform operations that filter the accessed data records of consolidated data records 142 in accordance with one or more filtration criteria. Executed filtration engine 152 may, for example, determine that a subset of the data records of consolidated data records 142 are consistent with, and in compliance with, the one or more filtration criteria, and may perform operations that stored the filtered subset of the data records within a corresponding portion of consolidated data store 144, e.g., as filtered data records 154.

In some examples, the one or more filtration criteria may include a product-specific filtration criterion that, when processed by executed filtration engine 152, causes executed filtration engine 152 may to exclude, from filtered data records 154, one or more of consolidated data records 142 identifying and characterizing a customer that fails to hold an unsecured credit product during the corresponding temporal interval (e.g., based on an account identifier of the corresponding financial product), or a customer characterized by an absence of historical transaction data during a prior temporal interval (e.g., before a threshold date, etc.). Further, any by way of example, the one or more filtration criteria may include an event-specific criterion that, when processed by executed filtration engine 152, causes executed filtration engine 152 may to exclude, from filtered data records 154, one or more of consolidated data records 142 identifying and characterizing a corresponding customer that fails hold one an unsecured credit product involved in a delinquency event during the corresponding temporal interval.

Additionally, in some examples, the one or more filtration criteria may include a treatment-specific filtration criterion that, when processed by executed filtration engine 152, causes executed filtration engine 152 may to exclude, from filtered data records 154, one or more of consolidated data records 142 that are associated with a corresponding customer holding an unsecured financial product, and that associated with an applied, external treatment not associated with an assignment to a third-party collections agency (e.g., a sale of the past-due balance of the delinquent, unsecured credit product, etc.), that are associated with an assignment to a third-party collections agency having an assignment period disposed outside of a predetermined temporal range, or that are characterized by an anomalous recovery rate by a third-party collections agency (e.g., less than 0%, or greater than 100%, etc.). The disclosed embodiments are, however, not limited to these exemplary filtration criteria, and in other instances, executed filtration engine 152 may apply any additional or alternate filtration criterion to the data records of consolidated data records 142 that would be appropriate to the customers of the financial institution, the financial institution, and consolidated data records 142, and that would facilitate an adaptive training and validation of the exemplary machine-learning or artificial intelligence processes described herein.

Further, and as illustrated in FIG. 1B, executed filtration engine 152 may access discrete data record 142A of consolidated data records 142, which includes customer identifier 146 of the particular customer (e.g., "CUSTID"), temporal identifier 148 of the corresponding temporal interval (e.g., "2022-04-30"), account identifier 149 of the particular financial product (e.g., the portion of the tokenized account number), and consolidated data elements 150 that identify and characterize the particular customer during the corresponding temporal interval. In some instances, executed filtration engine 152 may perform operations that, based on account identifier 149, determine that the particular customer holds a credit-card account issued by the financial institution during the corresponding temporal interval. Further, executed filtration engine 152 may also perform operations that parse consolidated data elements 150 and obtain event data 156 characterizing an occurrence of a delinquency event involving the corresponding customer and the unsecured credit product during the corresponding temporal interval, and resolution data 158 characterizing a full, or partial, resolution of the delinquency event based on an application of one or more internal treatments or external treatments (e.g., assignments to third-party collections agencies, etc.) to the delinquent credit-card account during the temporal interval.

For example, and based on portions of event data 156, executed filtration engine 152 may establish that the credit-card account held by the particular customer is associated with a past-due balance of $5,500.00 and a past due period of ninety days (e.g., a ninety-day period between the April 30$^{th}$ ingestion data and the due date of the missed payment, etc.). Further, and based on portions of resolution data 158, executed filtration engine 152 may establish that the financial institution assigned the delinquent credit-card account, and the past-due balance of $5,500.00 to an initial one of a plurality of third-party collection agencies (e.g., based on an alphanumeric identifier of the initial third-party collections agency, and based on sequence data characterizing a position of the initial assignment within an assignment lifecycle, include within resolution data 158, s described herein) on Apr. 15, 2022 (e.g., based on an assignment time or date specified within resolution data 158, as described herein). Further, and based on portions of resolution data 158, executed filtration engine 152 may establish that the temporal assignment period associated with the initial assignment of the delinquent credit card account to the third-party collections agency includes a 400-day interval (e.g., based on temporal data maintained within resolution data 158, as described herein), and that the initial assignment recovered 75% of the initial, past-due balance of $5,500.00 (e.g., based on the recovery rate of the assigned past-due balance maintained within resolution data 158, as described herein).

In some instances, and based on account identifier 149 and based on the elements of event data 156 and resolution data 158 maintained within consolidated data elements 150, executed filtration engine 152 may establish that discrete data record 142A is consistent with each of the applied, product-, event-, and/or treatment-specific filtration criteria, and executed filtration engine 152 may establish that discrete data record 142A includes data appropriate for inclusion within one or more training and validation datasets, which facilitate an adaptive training of the exemplary machine learning or artificial intelligence processes described herein. As illustrated in FIG. 1B, executed filtration engine 152 may perform operations that store discrete data record 142A within an additional portion of consolidated data store 144, e.g., as one of filtered data records 154.

Executed filtration engine 152 may access each of the additional data records of consolidated data records 142 to perform any of the exemplary processes described herein to establish a consistency, or an inconsistency, between each of the additional data records and the product-, event-, or treatment-specific specific filtration criteria described herein. For example, based on the established consistency with all, or a selected subset, or these filtration criteria, executed filtration engine 152 may perform operations that store corresponding ones of the additional data records within filtered data records 154.

Referring back to FIG. 1B, an aggregation engine 157 executed by the one or more processors of FI computing system 130 may access each of the data records of filtered data records 154. As described herein, each of the accessed data records may include corresponding elements of consolidated data that identify and characterize a particular customer of the financial institution holding a delinquent financial product involved during a corresponding temporal interval (e.g., based on the data records of customer profile data 104A, account data 104B, transaction data 104C, delinquency data 104D, third-party agency data 106, and/or credit-bureau data 109A associated with the particular customer and ingested by FI computing system 130). Further, and for each of the accessed data records, executed aggregation engine 157 may perform operations that process the corresponding elements of consolidated data and generate elements of aggregated account data that characterize a usage of one or more financial products or instruments during the corresponding temporal interval, elements of aggregated transaction data characterizing a spending or purchasing habit of the particular customer during the corresponding temporal interval, and elements of aggregated agency data that characterize an aggregated or time-averaged performance of the one or more of the third-party collections agencies during the corresponding temporal interval. Executed aggregation engine 157 may also perform operations that store the generated elements of aggregated account, transaction, and agency data within corresponding ones of the data records of filtered data records 154.

By way of example, executed aggregation engine 157 may access discrete data record 142A within filtered data records 154, which includes consolidated data elements 150 that identifies and characterizes a particular customer of the financial institution (e.g., associated with customer identifier 146) that holds a delinquent financial product (e.g., the delinquent, secured credit-card account associated with account identifier 149) during a corresponding temporal interval (e.g., the one-month interval between Apr. 1, 2022, and Apr. 30, 2022, as specified by temporal identifier 148).

Executed aggregation engine 157 may also perform operations that obtain, from consolidated data elements 150, elements of account data that identify and characterize the interactions between the particular customer and the one or more financial products or instruments issued by the financial institution during the corresponding temporal interval (e.g., one or more data records of account data 104B ingested by FI computing system 130), elements of transaction data that identify and characterize one or more transactions initiated by the particular customer during the corresponding temporal interval (e.g., one or more data records of transaction data 104C ingested by FI computing system 130), elements of delinquency data that characterize the delinquent financial product and one or more internal or external treatments applied to the delinquent financial product during the corresponding temporal interval (e.g., one or more data records of delinquency data 104D ingested by FI computing system 130), and elements of third-party agency data that characterize a performance of one or more third-party collections agencies during the corresponding temporal interval (e.g., the data records of third-party agency data 106 ingested by FI computing system 130).

In some instances, executed aggregation engine 157 may perform operations that generate one or more elements of aggregated account data based on corresponding portions of the obtained account data elements, and that generate one or more elements of aggregated transaction data based on corresponding portions of the obtained transaction data elements. For example, the elements of aggregated account data 160 may include, but are not limited to, an average of a total balance across one or more credit products held by the business customer associated with customer identifier 146 during the temporal interval associated with temporal identifier 148 (e.g., an average balance across a credit-card account, a line-of-credit, a personal loan, etc.), an average of a total amount of credit extended to the business customer during the temporal interval, or an average balance of funds available to the business customer within one or more demand deposit accounts during the corresponding temporal interval. In some examples, the elements of aggregated transaction data may include, but are not limited to, a total transaction amount attributable to one or more types of transactions initiated by the business customer during the temporal interval, and values of aggregated transaction parameters that characterize a particular type or class of transaction. The disclosed embodiments are, however, not limited to these exemplary elements of aggregated account or transaction data, and in other instances, executed aggregation engine 157 may process filtered data records 154 and generate any additional, or alternate, elements of aggregated account or transaction data.

In some instances, executed aggregation engine 157 may perform operations that package the generated elements of aggregated account and transaction data into corresponding portions of aggregated account data 160, and that augment the accessed discrete data record 142A (e.g., as maintained within a portion of consolidated data store 144 associated with filtered data records 154) to include the elements of aggregated account data 160. Further, although not illustrated in FIG. 1B, executed aggregation engine 157 may also perform any of the exemplary processes described herein to access each additional, or alternate, data record of filtered data records 154, to generate one or more elements of aggregated account and transaction data associated with a corresponding one of the business customers during a corresponding temporal interval, and to augment each of the additional, or alternate, data records to include respective ones of the generate elements of aggregated account and transaction data.

Executed aggregation engine 157 may also perform operations that generate one or more elements of aggregated agency data based on corresponding portions of the obtained delinquency data and the obtained third-party agency data, and examples of the elements of aggregated agency data include, but are not limited to, a time-averaged or aggregate number of discrete interactions (e.g., voice-based calls, etc.) between each of the third-party collection agencies and customers associated with corresponding ones of the delinquent financial accounts, and an average rate of recovery across all, or subsets, of the delinquent financial products assigned to corresponding ones of the third-party collection agencies, across one or more temporal intervals, including the corresponding temporal interval associated with discrete data record 142A. The disclosed embodiments are, however, not limited to these exemplary elements of aggregated agency data, and in other instances, executed aggregation engine 157 may process discrete data record 142A and generate any additional, or alternate, elements of aggregated agency data that characterize one or more of the third-party collection agencies during the corresponding temporal interval.

In some instances, executed aggregation engine 157 may perform operations that package the generated elements of aggregated agency data into corresponding portions of aggregated account data 160, and that augment the accessed discrete data record 142A (e.g., as maintained within a portion of consolidated data store 144 associated with filtered data records 154) to include the elements of aggregated account data 160. Further, although not illustrated in FIG. 1B, executed aggregation engine 157 may also perform any of the exemplary processes described herein to access each additional, or alternate, data record of filtered data records 154, to generate one or more elements of aggregated account, transaction, or agency data associated with a corresponding one of the customers during a corresponding temporal interval, and to augment each of the additional, or alternate, data records to include respective ones of the generate elements of aggregated account and transaction data.

Further, as illustrated in FIG. 1B consolidated data store 144 may maintain each of filtered data records 154 in conjunction with one or more additional, or alternate, filtered data records associated with prior temporal intervals, such as one or more filtered data records 164. In some instances, executed pre-processing engine 140, executed filtration engine 152 may perform any of the exemplary processes described herein, either individually or collectively, to generate each of the filtered data records 164 based on elements of profile, account, transaction, delinquency, third-party agency, and credit-bureau data ingested from source systems 102 during corresponding ones of the prior temporal intervals. For example, filtered data records 164 may include a plurality of discrete data records, such as discrete data record 165, that are associated with and characterize a particular one of the customers of the financial institution that hold a corresponding financial product (e.g., an unsecured credit product) involved in an occurrence of a delinquency event during a corresponding one of the prior temporal intervals.

By way of example, discrete data record 165 may be associated with a prior temporal interval extending from Mar. 1, 2022, to Mar. 31, 2022, and discrete data record 165 may include a customer identifier 166 of the particular customer, a temporal identifier 167 of the prior temporal interval, an account identifier 168 of the delinquent financial product, and consolidated elements 169 of customer profile, account, transaction, delinquency, third-party agency, or credit-bureau data that characterize the particular customer during the prior temporal interval extending from Mar. 1, 2022, to Mar. 31, 2022, e.g., generated using any of the exemplary processes described herein. Further, discrete data record 165 may include one or more elements aggregated data 170, such as, but not limited to, elements of aggregated account, transaction, and agency data that that characterize a behavior of the particular customer, or a performance of one or more of the third-party collections agencies, during the prior temporal interval, e.g., generated using any of the exemplary processes described herein.

The disclosed embodiments are, however, not limited to the exemplary consolidated or filtered data records described herein, or to the exemplary temporal intervals described herein. In other examples, FI computing system 130 may generate, and the consolidated data store 144 may maintain, any additional or alternate number of discrete sets of filtered data records, having any additional or alternate composition, that would be appropriate to the elements of customer profile, account, transaction, collections, or credit-bureau data ingested by FI computing system 130 at the predetermined intervals described herein. Further, in some examples, FI computing system 130 may ingest elements of customer profile, account, transaction, delinquency, third-party, or credit-bureau data from source systems 102 at any additional, or alternate, fixed or variable temporal interval that would be appropriate to the ingested data.

In some instances, FI computing system 130 may perform any of the exemplary operations described herein to train adaptively a machine-learning or artificial-intelligence process to predict, for each of a plurality of candidate third-party collections agencies, an expected occurrence of one of a plurality of targeted classes of recovery events involving a delinquent financial product held by a customer of the financial institution during a future temporal interval using training datasets associated with a first prior temporal interval (e.g., a "training" interval), and using validation datasets associated with a second, and distinct, prior temporal interval (e.g., an out-of-time "validation" interval). By way of example, the delinquent financial product may include an unsecured credit product issued by the financial institution to the customer (e.g., a credit-card account, an unsecured personal loan, etc.), and as described herein, the machine-learning or artificial-intelligence process may include an ensemble or decision-tree process, such as a gradient-boosted decision-tree process (e.g., the XGBoost model). Further, the training and validation datasets may include, but are not limited to, values of adaptively selected features obtained, extracted, or derived from the filtered data records maintained within consolidated data store 144, e.g., from data elements maintained within the discrete data records of filtered data records 154 and the filtered data records 164.

For example, the distributed computing components of FI computing system 130 (e.g., that include one or more GPUs or TPUs configured to operate as a discrete computing cluster) may perform any of the exemplary processes described herein to adaptively train the machine learning or artificial intelligence process (e.g., the gradient-boosted, decision-tree process) in parallel through an implementation of one or more parallelized, fault-tolerant distributed computing and analytical processes. Based on an outcome of these adaptive training processes, FI computing system 130 may generate model coefficients, parameters, thresholds, and other modelling data that collectively specify the trained machine learning or artificial intelligence process, and may store the generated model coefficients, parameters, thresholds, and modelling data within a portion of the one or more tangible, non-transitory memories, e.g., within consolidated data store 144.

In some instances, the adaptively trained machine learning or artificial intelligence process (e.g., the trained XGBoost process described herein) may operate as a multiple-target classification process that, when applied to an input data set associated with the delinquent financial account, assigns each of the candidate third-party collections agencies to a corresponding one of the targeted classes of recovery events associated with the delinquent financial product. By way of example, the delinquent financial product may be associated with a past-due balance, which may include a principal amount, accrued interest, and/or imposed fees, and the financial institution may elect to assign the delinquent financial product, and a past-due balance, to a selected one of the plurality of candidate third-party collections agencies at a particular temporal assignment point (e.g., an initial assignment, a second or third assignment, a subsequent assignment, etc.) based on an output of the application of the adaptively trained machine learning or artificial intelligence to the input dataset.

The targeted classes of recovery events may include, among other things, (ii) a first targeted recovery class indicative of a predicted likelihood that a corresponding one of the third-party collections agencies will fail to recovery any portion of the past-due amount during the temporal assignment period (e.g., a "no-recovery" class); (ii) a second targeted recovery class indicative of a predicted likelihood that a corresponding one of the third-party collections agencies will recover between less that a first threshold percentage of the past-due amount during the temporal assignment period (e.g., a "low-recovery" class); (iii) a third targeted recovery class indicative of a predicted likelihood that a corresponding one of the third-party collections agencies will recover between the first threshold percentage and a second threshold percentage of the past-due amount during the temporal assignment period (e.g., a "medium-recovery" class); and (iv) a fourth targeted recovery class indicative of a predicted likelihood that a corresponding one of the third-party collections agencies will recover greater than the second threshold percentage of the past-due amount during the temporal assignment period (e.g., a "high-recovery" class). By way of example, and without limitation, the first threshold percentage may correspond to seven percent, and the second threshold percentage may correspond to fifty-five percent. The disclosed embodiments are, however, not limited to these exemplary targeted classes of recovery events, or to these exemplary recovery-rate boundaries, and in other instances, the plurality of targeted classes of recovery events may include any additional, or alternate, class of recovery events characterized by any additional, or alternate, class boundary that would be appropriate to the machine learning or artificial intelligence process and to the filtered data records maintained within consolidated data store 144 (e.g., filtered data records 154 and 164, etc.).

Further, each of the targeted recovery classes may be associated with a corresponding class identifier (e.g., a numerical value of zero, unity, two, or three associated with respective ones of the no-, low-, medium-, and high-recovery classes, as described herein), and upon application of the trained gradient-boosted, decision-tree process to the input dataset associated with the delinquent financial product, the distributed computing components of FI computing system 130 may perform any of the exemplary processes described herein to generate an element of output data that includes the class identifier of the corresponding targeted recovery class assigned to each of the candidate third-party collections agencies, which indicates, for each of the candidate third-party collections agencies, a corresponding, expected recovery rate of the past-due balance associated with the delinquent financial product during a temporal assignment period. Further, one or more computing systems of the financial institution may perform operations, described herein, to assign the delinquent financial product, and the past-due balance, to a corresponding one of the candidate third-party collections agencies based on the expected rates of recovery. Certain of these exemplary processes, which predict, in real-time, a rate of recovery for each of a plurality of third-party collection agencies during a future temporal interval based on an application of a trained machine learning or artificial intelligence process to an input dataset characterizing a delinquent financial product, and which enable the financial institution to assign the delinquent financial product to a corresponding one of the third-party collection agencies during a temporal assignment period based on the predicted recovery rates, may be implemented in addition to, or as an alternate to, many existing, subjective assignment processes that rely on an experience or an intuition of a representative of a financial institution.

Figure 1D:
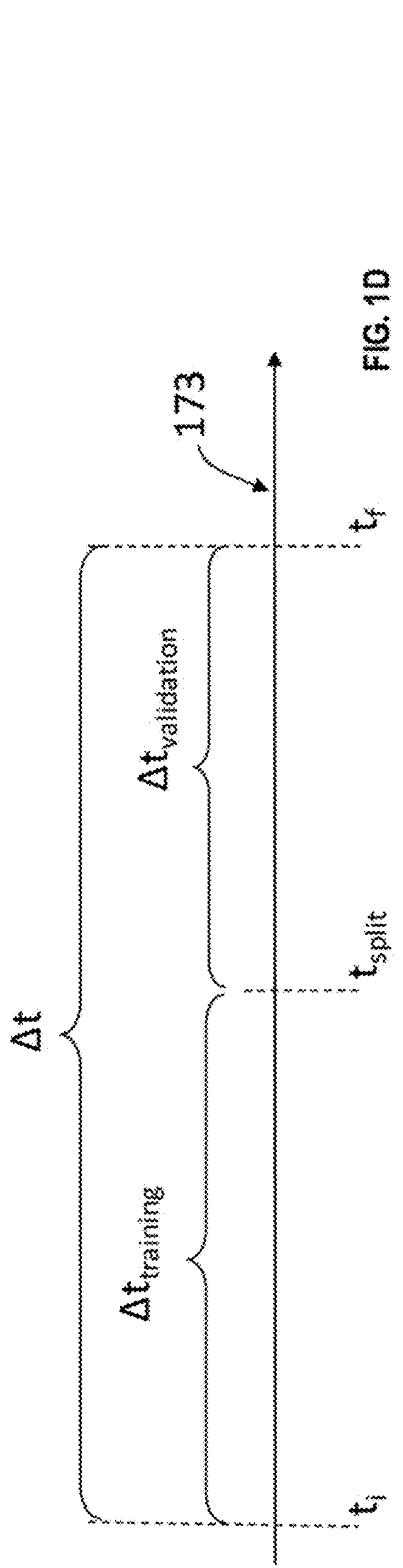
FIGS. 1D and 1E are diagrams of exemplary timelines for adaptively training a machine-learning or artificial intelligence process, in accordance with some exemplary embodiments.

Referring to FIG. 1C, a training engine 172 executed by the one or more processors of FI computing system 130 may access the filtered data records maintained within consolidated data store 144, such as, but not limited to, filtered data records 154 and filtered data records 164. In some instances, executed training engine 172 may parse the filtered data records 154 and 164, and based on corresponding ones of the temporal identifiers, determine that the consolidated elements of customer profile, account, transaction, delinquency, third-party agency or credit-bureau data characterize the delinquent financial product, the corresponding customers, and the corresponding third-party collections agencies across a range of prior temporal intervals. Executed training engine 172 may also perform operations that decompose the determined range of prior temporal intervals (associated with filtered data records 154 and 164) into a corresponding first subset of the prior temporal intervals (e.g., the "training" interval described herein) and into a corresponding second, subsequent, and disjoint subset of the prior temporal intervals (e.g., the "validation" interval described herein). For example, as illustrated in FIG. 1D, the range of prior temporal intervals (e.g., shown generally as Δt along timeline 173 of FIG. 1D) may be bounded by, and established by, temporal boundaries $t_i$ and $t_f$. Further, the decomposed first subset of the prior temporal intervals (e.g., shown generally as training interval $\Delta t_{training}$ along timeline 173 of FIG. 1D) may be bounded by temporal boundary $t_i$ and a corresponding splitting point $t_{split}$ along timeline 173, and the decomposed second subset of the prior temporal intervals (e.g., shown generally as validation interval $\Delta t_{validation}$ along timeline 173 of FIG. 1D) may be bounded by splitting point $t_{split}$ and temporal boundary $t_f$.

Referring back to FIG. 1C, executed training engine 172 may generate elements of splitting data 174 that identify and characterize the determined temporal boundaries (e.g., temporal boundaries $t_i$ and $t_f$) and the range of prior temporal intervals established by the determined temporal boundaries The elements of splitting data 174 may also identify and characterize the splitting point (e.g., the splitting point $t_{split}$ described herein), the first subset of the prior temporal intervals (e.g., the training interval $\Delta t_{training}$ described herein), and the second, and subsequent subset of the prior temporal intervals (e.g., the validation interval $\Delta t_{validation}$ described herein). In some instances, each of the prior temporal intervals may correspond to a one-month interval, and executed training engine 172 may perform operations that establish adaptively the splitting point between the corresponding temporal boundaries such that a first percentage of the consolidated data records are associated with temporal intervals disposed within the training interval, and such that a second percentage of the consolidated data records are associated with temporal intervals disposed within the validation interval.

By way of example, executed training engine 172 may compute one or both of the first and second percentages, and establish the splitting point, based on the range of prior temporal intervals, a quantity or quality of the consolidated data records maintained within consolidated data store 144, or a magnitude of the temporal intervals (e.g., one-month intervals, two-week intervals, one-week intervals, one-day intervals, etc.). As illustrated in FIG. 1C, executed training engine 172 may store the elements of splitting data 174 within the one or more tangible, non-transitory memories of FI computing system 130, e.g., within consolidated data store 144.

In some examples, a training input module 176 of executed training engine 172 may perform operations that access the filtered data records maintained within consolidated data store 144. Based on portions of splitting data 174, executed training input module 176 may perform operations that parse the filtered data records and determine: (i) a first subset 178A of these consolidated data records are associated with the training interval $\Delta t_{training}$ and may be appropriate to training adaptively the gradient-boosted decision model during the training interval; and a (ii) second subset 178B of these consolidated data records are associated with the validation interval $\Delta t_{validation}$ and may be appropriate to validating the adaptively trained gradient-boosted decision model during the validation interval. By way of example, executed training input module 176 may access splitting data 174, and establish the temporal boundaries for the training interval $\Delta t_{training}$ (e.g., temporal boundary $t_i$ and splitting point $t_{split}$) and the validation interval $\Delta t_{training}$ (e.g., splitting point $t_{split}$ and temporal boundary $t_f$). By way of example, executed training input module 176 may parse each of the filtered data records (e.g., filtered data records 154 and 164 of consolidated data records 142), access the corresponding temporal identifier, and determine the temporal interval associated with the each of the filtered data records.

If, for example, executed training input module 176 were to determine that the temporal interval associated with a corresponding one of the filtered data records is disposed within the temporal boundaries for the training interval $\Delta t_{training}$, executed training input module 176 may determine that the corresponding data record may be suitable for training, and may perform operations that include the corresponding data record within a portion of the first subset 178A (e.g., that store the corresponding data record within a portion of consolidated data store 144 associated with first subset 178A). Alternatively, if executed training input module 176 were to determine that the temporal interval associated with a corresponding one of the filtered data records is disposed within the temporal boundaries for the validation interval $\Delta t_{validation}$, executed training input module 176 may determine that the corresponding data record may be suitable for validation, and may perform operations that include the corresponding data record within a portion of the second subset 178B (e.g., that store the corresponding data record within a portion of consolidated data store 144 associated with second subset 178B). Executed training input module 176 may perform any of the exemplary processes described herein to determine the suitability of each additional, or alternate, one of the filtered data records for adaptive training, or alternatively, validation, of the gradient-boosted, decision-tree process.

Figure 1E:
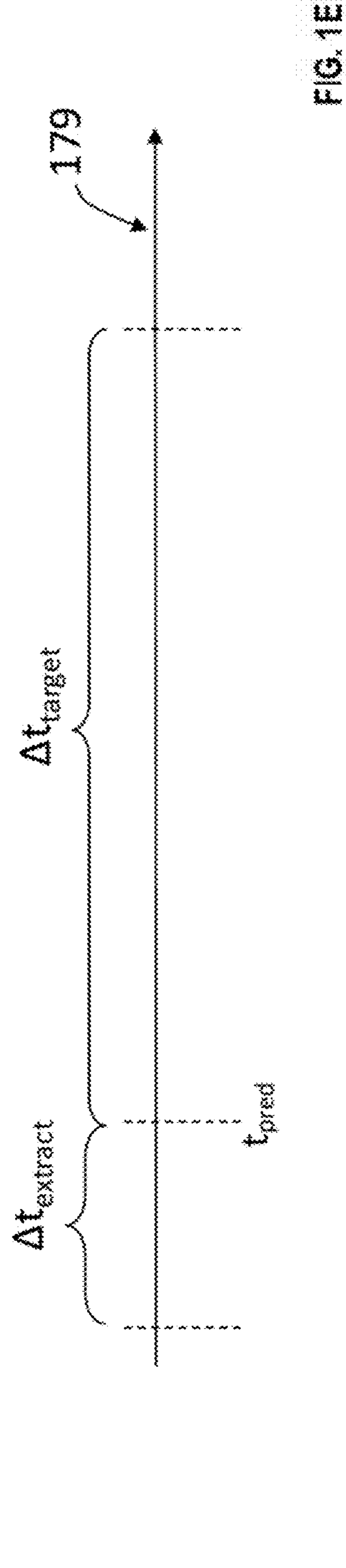

As described herein, FI computing system 130 may perform operations that adaptively train a machine-learning or artificial-intelligence process (e.g., the gradient-boosted, decision-tree process described herein) to predict, during a current temporal interval, and for each of a plurality of candidate third-party collections agencies, an expected occurrence of one of a plurality of targeted classes of recovery events involving a delinquent financial product held by a customer of the financial institution during a future temporal interval (e.g., one of the no-, low-, medium-, and high-recovery classes, as described herein) using training datasets associated with the training interval, and using validation datasets associated with the validation interval. For example, and as illustrated in FIG. 1E, the current temporal interval may be characterized by a temporal prediction point $t_{pred}$ along timeline 179, and the executed training engine 172 may perform any of the exemplary processes described herein to train adaptively machine-learning or artificial-intelligence process (e.g., the gradient-boosted, decision-tree process described herein) to predict the expected occurrences of the targeted classes of recovery events during a future, target temporal interval $\Delta t_{target}$ based on input datasets associated with a corresponding prior extraction interval $\Delta t_{extract}$.

By way of example, the target temporal interval $\Delta t_{target}$ may be characterized by a predetermined duration, such as, but not limited to, four hundred days, and the prior extraction interval $\Delta t_{extract}$ may be characterized by a corresponding, predetermined duration, such as, but not limited to, ninety days. The disclosed embodiments are not limited to prior extraction intervals and target intervals characterized by these exemplary predetermined durations, and in other examples, prior extraction interval $\Delta t_{extract}$ and future target temporal interval $\Delta t_{target}$ may be characterized by any additional, or alternate durations appropriate to the machine learning or artificial intelligence process (e.g., the XGBoost process described herein) and to the consolidated data records maintained within consolidated data store 144.

Referring back to FIG. 1C, executed training input module 176 may perform operations that generate a plurality of training datasets 180 based on elements of data obtained, extracted, or derived from all or a selected portion of first subset 178A of the filtered data records, and further, based on elements of targeting data 177 that identify and characterize not only the plurality of targeted classes of recovery events, but also the plurality of candidate third-party collections agencies available to receive assignments of delinquent financial products, e.g., for recovery of corresponding past-due balances. For example, the elements of targeting data 177 may include a unique alphanumeric identifier of each of the plurality of targeted classes of recovery events (e.g., a numerical value of zero, unity, two, or three associated with respective ones of the no-, low-, medium-, and high-recovery classes, as described herein) and ranges of recovery rates that define each of the targeted classes of recovery events. Further, in some instances, the elements of targeting data 177 may also include an alphanumeric identifier of each of the candidate third-party collections agencies.

In some instances, each of the plurality of training datasets 180 may be associated with a delinquent financial product (e.g., a delinquent, unsecured credit product, as described herein) and further, with an assignment of that delinquent financial product to a corresponding one of the third-party collection agencies (e.g., associated with a corresponding one of the alphanumeric identifiers, as described herein). Further, when provisioned to an input layer of the gradient-boosted decision-tree process described herein, each of the plurality of training datasets 180 may enable executed training engine 172 to train adaptively the gradient-boosted decision-tree process to predict, at temporal prediction point $t_{pred}$ during the current temporal interval, and for each of the candidate third-party collections agencies, an expected occurrence of one of a plurality of targeted classes of recovery events involving a corresponding delinquent financial product held by a customer of the financial institution during target temporal interval $\Delta t_{target}$. In some instances, temporal prediction point $t_{pred}$ may correspond to an assignment point at which the financial institution assigns the delinquent financial product to one of the candidate, third-party collections agencies (e.g., an initial assignment, a second or third assignment, a subsequent assignment, etc.).

Each of the plurality of training datasets 180 may include, among other things, an account identifier of the corresponding, delinquent financial product (e.g., the portion of the tokenized account number, as described herein), the alphanumeric identifier of the corresponding, third-party collections agency, an alphanumeric identifier of the corresponding customer, temporal data characterizing a time or date of the assignment of the delinquent financial product to the corresponding, third-party collections agency (e.g., that establishes temporal prediction point $t_{pred}$ during the current temporal interval), and/or sequence data characterizing a position of the assignment within an assignment lifecycle (e.g., initial, second, subsequent, etc.). Each of the plurality of training datasets 180 may also include elements of data (e.g., feature values) that identify and characterize interactions of the corresponding customer with the financial institution and with other financial institutions, that identify or characterize the delinquent financial product or an occurrence of a delinquency involving the delinquent financial product and the corresponding customer, and/or that characterize a performance of a one or more third-party collections agencies, including the assigned, third-party collections agency, during a temporal interval disposed prior to the corresponding temporal interval, e.g., prior extraction interval $\Delta t_{extract}$.

In some instances, executed training input module 176 may perform operations that identify, and obtain or extract, one or more of the features values from the filtered data records maintained within first subset 178A and associated with the corresponding ones of the delinquent financial products, corresponding ones of the customer, and corresponding ones of third-party collections agencies. The obtained or extracted feature values may, for example, include elements of the customer profile, account, transaction, delinquency, third-party agency, credit-bureau described herein (e.g., which may populate the filtered data records maintained within first subset 178A), and examples of these obtained or extracted feature values may include, but are not limited to, demographic data characterizing the corresponding customer (e.g., a customer age, etc.), data characterizing a relationship between the customer and the financial institution (e.g., a customer tenure, etc.), a balance or an amount of available credit (or funds) associated with one or more financial instruments held by the corresponding customer, a batch credit score of the corresponding customer, a number of credit inquiries involving the corresponding one of the customers, or a number of voice-based or digital interactions between the assigned, third-party collections agency and the customer that holds the delinquent financial product during the prior extraction interval $\Delta t_{extract}$. These disclosed embodiments are, however, not limited to these examples of obtained or extracted feature values, and in other instances, training datasets 180 may include any additional or alternate element of data extracted or obtained from the consolidated data records of first subset 178A, associated with corresponding one of the customers, and associated with the prior extraction interval $\Delta t_{extract}$ described herein.

Further, in some instances, executed training input module 176 may perform operations that compute, determine, or derive one or more of the features values based on elements of data extracted or obtained from the filtered data records maintained within first subset 178A. Examples of these computed, determined, or derived feature values may include, but are not limited to, time-averaged values of payments associated with one or more financial products held by the corresponding customer, time-averaged balances associated with these financial products, time-averaged spending (e.g., on an aggregate basis, or on a merchant- or product-specific basis, etc.) or time-averaged cash flow associated with these financial products, and/or sums of balances held in various demand or deposit accounts by corresponding ones of the customers, time-averaged numbers of voice-based or digital interactions between the assigned, third-party collections agency and the customer that holds the delinquent financial product during the prior extraction interval $\Delta t_{extract}$, or during a predetermined subset of the prior extraction interval $\Delta t_{extract}$, a number voice-based or digital interactions between the assigned, third-party collections agency and the customer that holds the delinquent financial product during the predetermined subset of the prior extraction interval $\Delta t_{extract}$. These disclosed embodiments are, however, not limited to these examples of computed, determined, or derived feature values, and in other instances, training datasets 180 may include any additional or alternate featured computed, determine, or derived from data extracted or obtained from the consolidated data records of first subset 178A, associated with corresponding one of the customers, and associated with the extraction interval $\Delta t_{extract}$ described herein.

Further, each of training datasets 180 may also be associated with an element of ground-truth data 181 indicative of an actual occurrence of one of the targeted classes of recovery events involving the corresponding delinquent financial product held by the corresponding customer, and the corresponding, third-party collections agency, during the target temporal interval $\Delta t_{target}$. As described herein, the plurality of targeted classes of recovery events may include, among other things, a no-recovery class, a low-recovery class, a medium-recovery class, and a high-recovery class. In some instances, executed training input module 176 may access one or more elements of targeting data 177, which include the alphanumeric identifiers of each of the plurality of targeted classes of recovery events (e.g., the numerical values of zero, unity, two, or three associated with the no-, low-, medium-, and high-recovery classes, as described herein) and the ranges of recovery rates that define each of the targeted classes of recovery events (e.g., the zero percent recovery rate for the no-recovery class, the range of recovery rates from zero to seven percent for the low-recovery class, the range of recovery rates from seven to fifty-five percent for the medium-recovery class, and the recovery rates exceeding fifty-five percent for the high-recovery class).

Executed training input module 176 may access one or more of the filtered data records that characterize the assignment of the corresponding, delinquent financial product held by the corresponding customer to the corresponding, third-party collections agency, during the target temporal interval $\Delta t_{target}$ (e.g., portions of resolution data 158 maintained within discrete data record 142A of filtered data records 154), and obtain the actual recovery rate that characterizes an recovery of a past-due balance of the corresponding, delinquent financial product by the corresponding, third-party collections agency during the assignment period. Based on the elements of targeting data 177, executed training input module 176 may assign the actual recovery by the corresponding, third-party collections to a one of the targeted classes of recovery rates, and may perform operations that package the alphanumeric identifier of the corresponding, third-party collections agency, the alphanumeric identifier of the assigned one of the targeted classes of recovery rates (e.g., a numerical value of zero, unity, two, or three associated with respective ones of the no-, low-, medium-, and high-recovery classes, as described herein), and in some instances, portions of the sequence data (e.g., characterizing a position of the assignment of the corresponding, delinquent financial product to the corresponding, third-party collection within an assignment lifecycle, as specified within resolution data 158) into the corresponding element of ground-truth data 185.

Referring back to FIG. 1C, executed training input module 176 may provide training datasets 180 and the corresponding elements of ground-truth data 181, and in some instances, the elements of targeting data 177, as inputs to an adaptive training and validation module 182 of executed training engine 172. Upon execution by the one or more processors of FI computing system 130, adaptive training and validation module 182 may perform operations that train adaptively the machine-learning or artificial-intelligence process in accordance with the elements of targeting data 177 and against the elements of training data included within each of training datasets 180 and corresponding elements of ground-truth data 181. In some examples, the distributed components of FI computing system 130 may execute adaptive training and validation module 182, and may perform any of the exemplary processes described herein in parallel to train adaptively the machine-learning or artificial-intelligence process in accordance with the elements of targeting data 177 and against the elements of training data included within each of training datasets 180 and corresponding elements of ground-truth data 181. The parallel implementation of adaptive training and validation module 182 by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.).

By way of example, the machine-learning or artificial-intelligence process may include an ensemble or decision-tree process, such as a gradient-boosted decision-tree process (e.g., an XGBoost process), and executed adaptive training and validation module 182 may perform operations establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets 180. Based on the execution of adaptive training and validation module 182, and on the ingestion of each of training datasets 180 by the established nodes of the gradient-boosted, decision-tree process, FI computing system 130 may perform operations that adaptively train the gradient-boosted, decision-tree process in accordance with the elements of targeting data 177 and against the elements of training data included within each of training datasets 180 and corresponding elements of ground-truth data 185. In some examples, during the adaptive training of the gradient-boosted, decision-tree process, executed adaptive training and validation module 182 may perform operations that characterize a relative of importance of discrete features within one or more of training datasets 180 through a generation of corresponding Shapley feature values and through a generation of values of probabilistic metrics that average a computed area under curve for receiver operating characteristic (ROC) curves across corresponding pairs of the targeted classes of acquisition events, such as, but limited to a value of a multiclass, one-versus-all area under curve (MAUC) computed for one or more of the training datasets.

In some instances, executed adaptive training and validation module 182 may perform operations that adaptively train the gradient-boosted, decision-tree process described herein to predict, at temporal prediction point $t_{pred}$, and for each of the p candidate third-party collections agencies, an expected occurrence of one of the targeted classes of recovery events involving a corresponding delinquent financial product held by during future, target temporal interval $\Delta t_{target}$. In some instances, temporal prediction point $t_{pred}$ may correspond to an initial assignment of a corresponding, delinquent financial product to a corresponding, third-party collection agency, to a second, a third, or a subsequent assignment of the corresponding, delinquent financial product to the corresponding, third-party collection agency, or to an additional, or alternate, third-party collection agency specified within targeting data 177. Further, each of these initial, second, third, or subsequent assignments of the corresponding, delinquent financial product to one of the third-party collection agency may be associated with a corresponding temporal assignment period, such as, but not limited to, a temporal interval up to, but not exceeding, four-hundred days. Through a performance of certain of the exemplary processes described herein, executed training engine 172 may train adaptively the gradient-boosted, decision-tree process to predict, during the future, target temporal interval $\Delta t_{target}$, an expected occurrence of one of the targeted classes of recovery events involving an initial, or subsequent assignment of the corresponding, delinquent financial product to corresponding ones of the plurality of candidate third-party collections agencies across corresponding, and potentially distinct, temporal assignment intervals.

Through the performance of these adaptive training processes, executed adaptive training and validation module 182 may perform operations that compute one or more candidate process parameters that characterize the adaptively trained, gradient-boosted, decision-tree process, and package the candidate process parameters into corresponding portions of candidate process data 184. In some instances, the candidate process parameters included within candidate process data 184 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, and based on the performance of these adaptive training processes, executed adaptive training and validation module 182 may also generate candidate input data 186, which specifies a candidate composition of an input dataset for the adaptively trained, gradient-boosted, decision-tree process (e.g., which be provisioned as inputs to the nodes of the decision trees of the adaptively trained, gradient-boosted, decision-tree process).

As illustrated in FIG. 1C, executed adaptive training and validation module 182 may provide candidate process data 184 and candidate input data 186 as inputs to executed training input module 176 of training engine 172, which may perform any of them exemplary processes described herein to generate a plurality of validation datasets 188 having compositions consistent with candidate input data 186. By way of example, each of the plurality of validation datasets 188 may be associated with a delinquent financial product (e.g., a delinquent, unsecured credit product, as described herein) and further, with an assignment of that delinquent financial product to a corresponding one of a predetermined set of third-party collection agencies (e.g., associated with a corresponding one of the alphanumeric identifiers, as described herein) during a corresponding temporal interval, e.g., within the validation interval $\Delta t_{validation}$ described herein. Each of the plurality of validation datasets 188 may include an account identifier of the corresponding, delinquent financial product (e.g., the portion of the tokenized account number, as described herein), an alphanumeric identifier of the corresponding, third-party collections agency, an alphanumeric identifier of the corresponding customer, temporal data characterizing a time or date of the assignment of the delinquent financial product to the corresponding, third-party collections agency (e.g., that establishes temporal prediction point $t_{pred}$ during the temporal interval), and/or sequence data characterizing a position of the assignment within an assignment lifecycle (e.g., initial, second, subsequent, etc.).

In some instances, executed training input module 176 may parse candidate input data 186 to obtain the candidate composition of the input dataset, which not only identifies the candidate elements of product-specific, customer-specific and agency-specific data included within each validation dataset (e.g., the candidate feature values described herein), but also a candidate sequence or position of these elements of customer-specific and agency-specific data within the validation dataset. Examples of these candidate feature values include, but are not limited to, one or more of the feature values extracted, obtained, computed, determined, or derived by executed training input module 176 and packaged into corresponding portions of training datasets 180, as described herein.

For example, executed training input module 176 may access the filtered data records maintained within second subset 1786, and based on portions of candidate input data 186, may perform any of the exemplary processes described herein to obtain or extract, or to compute, determine, or derive, the customer-specific and agency-specific feature values of the validation datasets. Executed training input module 176 may package each of the customer-specific feature values (e.g., as obtained, extracted, computed, determined, or derived from the filtered data records within second subset 178B) into corresponding positions within customer-specific ones of validation datasets 188, e.g., in accordance with the candidate sequence or position specified within candidate input data 186. In some instances, executed training input module 176 may perform any of the exemplary processes described herein to generate a corresponding one of validation datasets 188 associated with each combination of delinquent financial product and corresponding agency assignment identified and characterized within the filtered data records of second subset 178B. Although in other instances, executed training input module 176 may perform any of the exemplary processes described herein to generate a predetermined number of discrete validation datasets specified within candidate input data 186, or discrete validation data sets consistent with candidate input data 186 and associated with a predetermined set of delinquent financial products and corresponding agency assignments.

The corresponding one of validation datasets 188 may also be associated with an element of ground-truth data 189 indicative of an actual occurrence of one of the targeted classes of recovery events involving the corresponding delinquent financial product held by the corresponding customer, and the corresponding, candidate third-party collections agency, during the target temporal interval $\Delta t_{target}$. For example, and as described herein, the plurality of targeted classes of recovery events may include, among other things, a no-recovery class, a low-recovery class, a medium-recovery class, and a high-recovery class, and executed training input module 176 may perform operations, described herein in reference to the elements of ground-truth data 181, to generate corresponding ones of the elements of ground-truth data 189 based on the filtered data records that characterize the assignment of the corresponding, delinquent financial product held by the corresponding customer to the corresponding, third-party collections agency, during the target temporal interval $\Delta t_{target}$.

Referring back to FIG. 1C, executed training input module 176 may provide the plurality of validation datasets 188, and the corresponding elements of ground-truth data 189, as inputs to executed adaptive training and validation module 182. In some examples, executed adaptive training and validation module 182 may perform operations that apply the adaptively trained, gradient-boosted, decision-tree process to respective ones of validation datasets 188 (e.g., based on the candidate process parameters within candidate process data 184, as described herein), and that generate elements of output data based on the application of the adaptively trained, gradient-boosted, decision-tree process to the respective ones of validation datasets 188.

As described herein, each of the each of elements of output data may be generated through the application of the adaptively trained, gradient-boosted, decision-tree process to a corresponding one of validation datasets 188. Further, as described herein, each of the elements of output data may include, for a delinquent financial product associated with a corresponding one of validation datasets 188, an identifier of the delinquent financial product (e.g., the portion of the tokenized account number), and data identify and characterizing an expected occurrence of one of the targeted classes of recovery events that would result from an assignment of the delinquent financial product to corresponding ones of the candidate third-party collections agencies (e.g., as specified within targeting data 177). For example, each of the targeted recovery classes may be associated with a corresponding class identifier (e.g., a numerical value of zero, unity, two, or three associated with respective ones of the no-, low-, medium-, and high-recovery classes, as described herein), and each of the elements of output data may include a data structure (e.g., a two-dimensional array) that associates, or links together, each of the identifiers of the candidate third-party collections agencies (e.g., the alphanumeric identifiers described herein) with the corresponding class identifiers indicative of the expected occurrence of the corresponding one of the targeted classes of recovery events.

Executed adaptive training and validation module 182 may also perform operations that compute a value of one or more metrics that characterize a predictive capability, and an accuracy, of the adaptively trained, gradient-boosted, decision-tree process based on the generated elements of output data, corresponding ones of validation datasets 188, and in some instances, corresponding elements of ground-truth data 189. The computed metrics may include, but are not limited to, one or more recall-based values for the adaptively trained, gradient-boosted, decision-tree process (e.g., "recall@5," "recall@10," "recall@20," etc.), and additionally, or alternatively, one or more precision-based values for the adaptively trained, gradient-boosted, decision-tree process.

Further, in some examples, the computed metrics may include a computed value of an area under curve (AUC) for a precision-recall (PR) curve associated with the adaptively trained, gradient-boosted, decision-tree process, a computed value of an AUC for a receiver operating characteristic (ROC) curve associated with the adaptively trained, gradient-boosted, decision-tree process, and additionally, or alternatively, a computed value of multiclass, one-versus-all area under curve (MAUC) for a ROC curve across the corresponding pairs of the targeted classes of recovery events associated with the adaptively trained, gradient-boosted, decision-tree process. The disclosed embodiments are, however, not limited to these exemplary computed metric values, and in other instances, executed adaptive training and validation module 182 may compute a value of any additional, or alternate, metric appropriate to validation datasets 188, the elements of ground-truth data, or the adaptively trained, gradient-boosted, decision-tree process In some examples, executed adaptive training and validation module 182 may also perform operations that determine whether all, or a selected portion of, the computed metric values satisfy one or more threshold conditions for a deployment of the adaptively trained, gradient-boosted, decision-tree process and a real-time application to elements of customer profile, account, transaction, branch-access and/or digital-access data, as described herein. For instance, the one or more threshold conditions may specify one or more predetermined threshold values for the adaptively trained, gradient-boosted, decision-tree mode, such as, but not limited to, a predetermined threshold value for the computed recall-based values, a predetermined threshold value for the computed precision-based values, and/or a predetermined threshold value for the computed AUC values and/or MAUC values. In some examples, executed adaptive training and validation module 182 that establish whether one, or more, of the computed recall-based values, the computed precision-based values, or the computed AUC or MAUC values exceed, or fall below, a corresponding one of the predetermined threshold values and as such, whether the adaptively trained, gradient-boosted, decision-tree process satisfies the one or more threshold requirements for deployment.

If, for example, executed adaptive training and validation module 182 were to establish that one, or more, of the computed metric values fail to satisfy at least one of the threshold requirements, FI computing system 130 may establish that the adaptively trained, gradient-boosted, decision-tree process is insufficiently accurate for deployment and a real-time application to the elements of customer profile, account, transaction, delinquency, third-party agency, or credit-bureau data described herein. Executed adaptive training and validation module 182 may perform operations (not illustrated in FIG. 1B) that transmit data indicative of the established inaccuracy to executed training input module 176, which may perform any of the exemplary processes described herein to generate one or more additional training datasets, and elements of ground-truth data, and to provision those additional encrypted training datasets to executed adaptive training and validation module 182. In some instances, executed adaptive training and validation module 182 may receive the additional training datasets, and may perform any of the exemplary processes described herein to train further the gradient-boosted, decision-tree process against the elements of training data included within each of the additional training datasets.

Alternatively, if executed adaptive training and validation module 182 were to establish that each computed metric value satisfies threshold requirements, FI computing system 130 may deem the gradient-boosted, decision-tree process adaptively trained, and ready for deployment and real-time application to the elements of customer profile, account, transaction, delinquency, third-party agency, and/or credit-bureau data described herein. In some instances, executed adaptive training and validation module 182 may generate process parameter data 190 that includes the model parameters of the adaptively trained, gradient-boosted, decision-tree process, such as, but not limited to, each of the candidate process parameters specified within candidate process data 184. Further, executed adaptive training and validation module 182 may also generate process input data 192, which characterizes a composition of an input dataset for the adaptively trained, gradient-boosted, decision-tree process and identifies each of the discrete data elements within the input dataset, along with a sequence or position of these elements within the input data set (e.g., as specified within candidate input data 186). As illustrated in FIG. 1C, executed adaptive training and validation module 182 may perform operations that store process parameter data 190 and process input data 192 within the one or more tangible, non-transitory memories of FI computing system 130, such as consolidated data store 144.

B. Exemplary Processes for Predicting Occurrences of Targeted Recovery Events Using Adaptively Trained, Machine-Learning or Artificial-Intelligence Processes In some examples, one or more computing systems associated with or operated by a financial institution, such as one or more of the distributed components of FI computing system 130, may perform operations that adaptively train a machine learning or artificial intelligence process to predict, at a temporal prediction point during a current temporal interval, for each of a plurality of candidate third-party collections agencies, an expected occurrence of one of a plurality of targeted classes of recovery events involving a delinquent financial product during a future temporal interval using training datasets associated with a first prior temporal interval, and using validation datasets associated with a second, and distinct, prior temporal interval. As described herein, the delinquent financial product may include an unsecured credit product issued by the financial institution to a customer, such as a credit-card account, an unsecured loan, or an unsecured line-of-credit, and the plurality of targeted classes of recovery events may include, among other things, a no-recovery class, a low-recovery class, a medium-recovery class, and a high-recovery class associated with corresponding, and distinct, ranges of recovery rates.

As described herein, the machine-learning or artificial-intelligence process may include an ensemble or decision-tree process, such as a gradient-boosted, decision-tree process (e.g., the XGBoost process), and each of the training and validation datasets may be associated with a delinquent financial product held by a corresponding customer of the financial institution and an assignment of that delinquent financial product to a corresponding one of the candidate third-party collections agencies, e.g., at the temporal prediction points described herein. Further, the training and validation datasets may include, but are not limited to, feature values obtained, derived, or computed from the elements of the customer profile, account, transaction, delinquency, third-party agency, and credit-bureau data characterizing corresponding ones of the customers of the financial institution and maintained within filtered data records 154 or 164.

In some instances, upon application of the trained gradient-boosted, decision-tree process to an input dataset associated with a particular delinquent financial product (and corresponding customer), the distributed computing components of FI computing system 130 may perform any of the exemplary processes described herein to generate elements to output data that include, among other things, an identifier of the particular delinquent financial product (e.g., the portion of the tokenized account number), and data identifying and characterizing an expected occurrence of a corresponding one of the targeted classes of recovery events that would result from an assignment of the particular delinquent financial product to each of the candidate third-party collections agencies (e.g., as specified within targeting data 177). As described herein, each of the targeted recovery classes may be associated with a corresponding class identifier (e.g., a numerical value of zero, unity, two, or three associated with respective ones of the no-, low-, medium-, and high-recovery classes, as described herein), and each of the elements of output data may include the identifier of the delinquent financial product and additional data (e.g., a two-dimensional array) that associates, or links together, each of the identifiers of the candidate third-party collections agencies (e.g., the alphanumeric identifiers described herein) with the corresponding class identifier indicative of the expected occurrence of the corresponding one of the targeted classes of recovery events.

Through the implementation of the exemplary processes described herein, which adaptively train and validate a machine-learning or artificial-intelligence process (such as the gradient-boosted, decision-tree process described herein) using customer-, product-, and assignment-specific training and validation datasets associated with respective training and validation intervals, and which apply the trained and validated machine-learning or artificial-intelligence process to an input dataset associated with a delinquent financial product and/or a corresponding customer of the financial institution, FI computing system 130 may predict, in real-time, and at a temporal prediction point, likelihood that one of the targeted classes of recovery events would result from an assignment of the delinquent financial product to each of the plurality of candidate third-party collections agencies during a future temporal interval, such as, but not limited to, a temporal assignment period of up to four-hundred days subsequent to temporal prediction point. (e.g., via the implementation of the parallelized, fault-tolerant distributed computing and analytical protocols described herein across clusters of GPUs and/or TPUs).

These exemplary processes may, for example, provide, to the financial institution, a real-time indication of an expected recovery rate associated with the an assignment of a delinquent financial product to each of a predetermined set of candidate third-party collection agencies, and may enable one or more additional computing systems of the financial institution to assign, in real time, the delinquent financial product to a corresponding one of the candidate third-party collection agencies that yields a maximum recovery of a corresponding past-due balance of the delinquent financial product during a corresponding temporal assignment period. Further, one or more of these exemplary processes may be implemented in addition to, or as an alternate to, many subject agency-assignment processes, which rely on an experience, and intuition, of representatives of the financial institution. In some instances, when implemented in parallel by the distributed computing components of FI computing system 130, certain of these exemplary processes may reduce an amount of computational time and an amount of discrete computational operations required to adaptively train and validate a gradient-boosted, decision-tree process using the product- and assignment-specific training and validation datasets, and to predict the expected recovery rate associated with an assignment of a delinquent financial product to each of a predetermined set of candidate third-party collection agencies, when compared to existing processes that iteratively train and validate the existing product-specific machine-learning or artificial-intelligence processes against multiple sets of product-specific training and validation datasets.

Figure 2A:
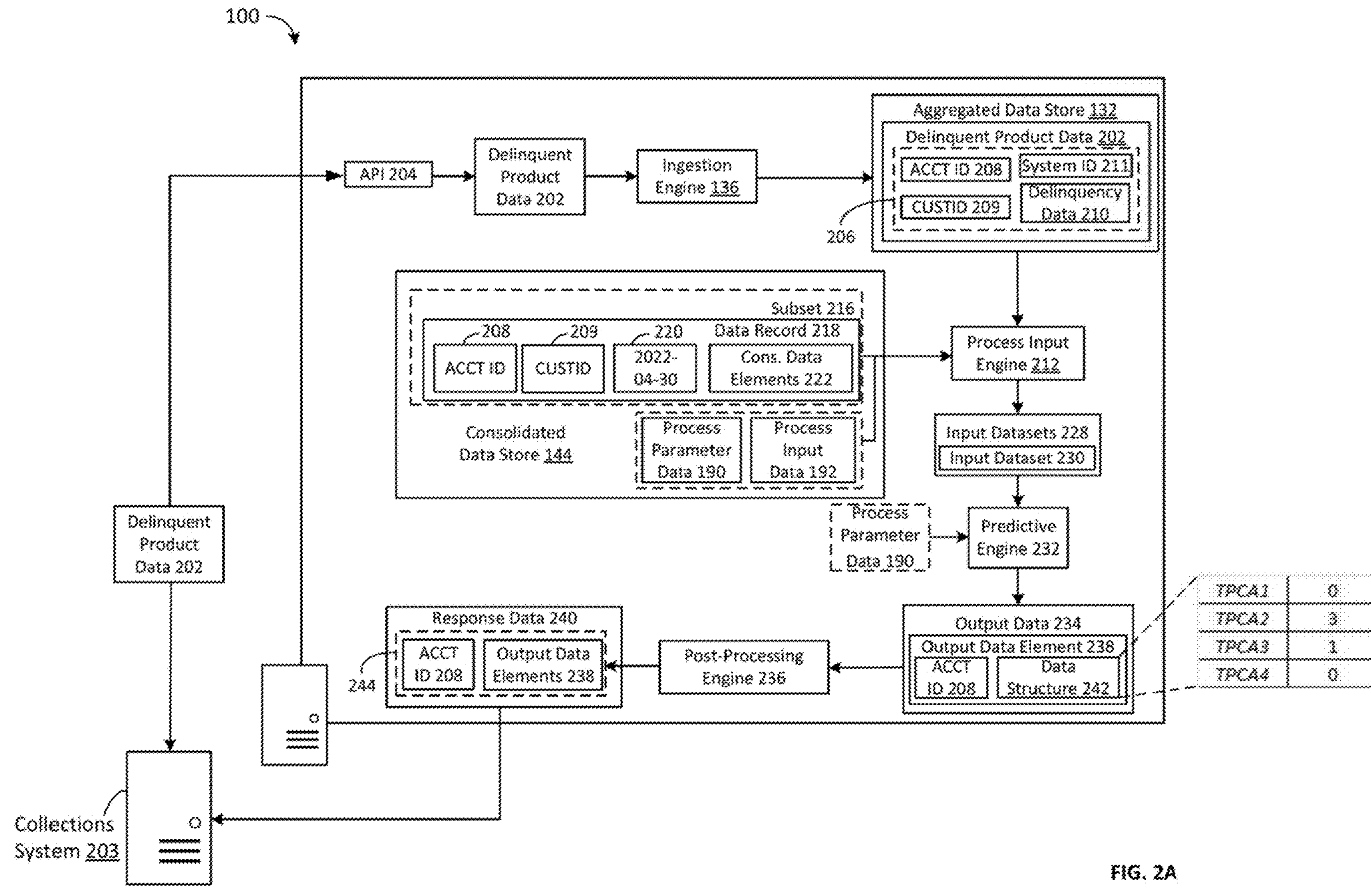
FIGS. 2A and 2B are block diagrams illustrating additional portions of the exemplary computing environment, in accordance with some exemplary embodiments.

Referring to FIG. 2A, aggregated data store 132 of FI computing system 130 may maintain one or more elements of delinquent product data 202, each of which may identify and characterize a delinquent financial product issued to a corresponding customer by the financial institution and involved in a delinquency event characterized by a corresponding past-due balance and a past-due period (e.g., a temporal interval between a current date and the due date of the missed payment). Each of the delinquency events may, for example, represent a late-stage delinquency event associated with multiple, missed monthly payments and a corresponding past-due period that exceeds the predetermined threshold period and as described herein, and responsive of the occurrence of the late-stage delinquency events, the financial institution may elect to assign each of the delinquent financial products to a corresponding one of plurality of candidate third-party collections agencies, e.g., as an initial assignment to recover the initial, past-due balance (including an initial principal amount, accused interest, imposed fees, etc.), or as a subsequent re-assignment to recover a past-due amount remaining from a prior assignment (including any remaining principal amount, additional accused interest and imposed fees, etc.).

As illustrated in FIG. 2A, FI computing system 130 may receive all, or a selected portion, of the elements of delinquent product data 202 across network 120 from a collections system 203 associated with the financial institution. For example, FI computing system 130 may receive all, or the selected portion, of the elements of delinquent product data 202 from collections system 203 in accordance with a predetermined schedule (e.g., on a daily basis at a predetermined time) or alternatively, on a continuous and streaming basis through a programmatic channel of communications. In some instances, collections system 203 may represent a computing system that includes one or more servers and tangible, non-transitory memories storing executable code and application modules. Further, the one or more servers may each include one or more processors (such as a central processing unit (CPU)), which may be configured to execute portions of the stored code or application modules to perform operations consistent with the disclosed embodiments. Collections system 203 may also include a communications interface, such as one or more wireless transceivers, coupled to the processors for accommodating wired or wireless internet communication with other computing systems and devices operating within environment 100.

In some instances, (not illustrated in FIG. 2A), an application program executed by the one or more processors of collections system 203, may transmit portions of the elements of delinquent product data 202 across network 120 to FI computing system 130. The transmitted portions may be encrypted using a corresponding encryption key, such as a public cryptographic key associated with FI computing system 130, and a programmatic interface established and maintained by FI computing system 130, such as application programming interface (API) 204, may receive the portions of delinquent product data 202 from collections system 203. API 204 may, for example, route each of the elements of delinquent product data 202 to executed data ingestion engine 136, which may perform operations that store the elements of delinquent product data 202 within one or more tangible, non-transitory memories of FI computing system 130, such as within aggregated data store 132.

In some instances, and as described herein, the received elements of delinquent product data 202 may be encrypted, and executed data ingestion engine 136 may perform operations that decrypt each of the encrypted elements of delinquent product data 202 using a corresponding decryption key (e.g., a private cryptographic key associated with FI computing system 130) prior to storage within aggregated data store 132. Further, although not illustrated in FIG. 2A, aggregated data store 132 may also store one or more additional elements of data identifying delinquent financial products issued to corresponding customers by the financial institution and involved in corresponding delinquency events, and executed data ingestion engine 136 may perform one or more synchronization operation that merge the received elements of delinquent product data 202 with the previously stored elements of delinquent product data, and that eliminate any duplicate elements existing among the received elements of delinquent product data 202 with the previously stored elements of delinquent product data (e.g., through an invocation of an appropriate Java-based SQL "merge" command).

As described herein, each of the elements of delinquent product data 202 may be associated with, and identify and characterize, a delinquent financial product issued to a corresponding customer by the financial institution and involved in a late-stage delinquency event characterized by a corresponding past-due balance and a past-due period. For example, as illustrated in FIG. 2A, element 206 of delinquent product data 202 may include an account identifier 208 of a corresponding one of the delinquent financial products (e.g., a portion of a tokenized account number, etc.), a customer identifier 209 of a customer holding the corresponding delinquent financial product (e.g., an alphanumeric authentication credential, etc.), elements of delinquency data 210 that characterize a scope of the late-stage delinquency event involving the corresponding delinquent financial product (e.g., a value of the past-due balance or the past-due period, etc.), and a system identifier 211 associated with collections system 203 (e.g., an Internet Protocol (IP) address, a media access control (MAC) address, etc.). Further, although not illustrated in FIG. 2A, each additional, or alternate, element of delinquent product data 202 may be associated with an additional one of the delinquent financial products and late-stage delinquency events, and may include, among other things, a corresponding account identifier, a customer identifier, elements of delinquency data that characterize a scope of the additional, late-stage delinquency event, and system identifier 211.

FI computing system 130 may perform any of the exemplary processes described herein to generate an input dataset associated with each of the delinquent financial products, and late-stage delinquency events associated with the discrete elements of delinquent product data 202, and to apply the adaptively trained, gradient-boosted, decision-tree process described herein to each of the input datasets, in accordance with a predetermined temporal schedule (e.g., on a daily basis, etc.), or in response to a detection of a triggering event. By way of example, the triggering event may correspond to a detected change in a composition of the elements of delinquent product data maintained within aggregated data store 132 (e.g., to an ingestion of additional elements of delinquent product data, etc.) or to a receipt of an explicit request received from collections system 203.

In some instances, and in accordance with the predetermined temporal schedule, or upon the detection of the triggering event, a process input engine 212 executed by FI computing system 130 may perform operations that access the elements of delinquent product data 202 maintained within aggregated data store 132, and that obtain the account identifier (e.g., identifying a corresponding one of the delinquent financial products) and the customer identifier (e.g., identifying a corresponding customer) maintained within a corresponding one of the accessed elements of delinquent product data 202. For example, as illustrated in FIG. 2A, executed process input engine 212 may access element 206 of delinquent product data 202 (e.g., as maintained within aggregated data store 132) and obtain account identifier 208 of the corresponding delinquent financial product (e.g., a portion of a tokenized account number, etc.) and customer identifier 209 of the customer holding the corresponding delinquent financial product.

Executed process input engine 212 may also access consolidated data store 144, and perform operations that identify, within consolidated data records 214, a subset 216 of consolidated data records that include account identifier 208 and customer identifier 209 and as such, are associated with the delinquent financial product and the corresponding, late-stage delinquency event characterized by element 206 of delinquent product data 202. As described herein, each of consolidated data records 214 may also be associated with a corresponding temporal interval, and may identify and characterize interactions between the customer that holds the delinquent financial product and the financial institution (and with other financial institutions) during the temporal interval, the occurrence of late-stage delinquency event and one or more internal treatments or external treatments (e.g., assignments to third-party collections agencies, etc.) applied to the delinquent financial product during the temporal interval, and in some instances, a performance of one or more third-party collections agencies during the temporal interval. By way of example, data record 218 of subset 216 may include customer identifier 209, a corresponding temporal identifier 220 (e.g., "2022-04-30," indicating a temporal interval spanning Apr. 1, 2022, through Apr. 30, 2022), account identifier 208 of the delinquent financial product, consolidated data elements 222, which identify and characterize the particular customer during the temporal interval.

Consolidated data elements 222 may, for example, identify and characterize the customer of the financial institution (e.g., associated with customer identifier 209) that holds the delinquent financial product (e.g., the delinquent, unsecured credit account associated with account identifier 208) during a corresponding temporal interval (e.g., the one-month interval between Apr. 1, 2022, and Apr. 30, 2022, as specified by temporal identifier 220). By way of example, consolidated data elements 222 may include any of the exemplary data elements obtained from, computed or derived from, or aggregated on the basis of, the data records of customer profile data 104A, account data 104B, transaction data 104C, delinquency data 104D, third-party agency data 106, and/or credit-bureau data 109A associated with account identifier 208 and/or customer identifier 209.

Executed process input engine 212 may also perform operations that obtain, from consolidated data store 144, elements of process input data 192 that characterize a composition of an input dataset for the adaptively trained, gradient-boosted, decision-tree process. In some instances, executed process input engine 212 may parse process input data 192 to obtain the composition of the input dataset, which not only identifies the elements of customer-specific data included within each input data set dataset (e.g., input feature values, as described herein), but also a specified sequence or position of these input feature values within the input dataset. Examples of these input feature values include, but are not limited to, one or more of the candidate feature values extracted, obtained, computed, determined, or derived by executed training input module 176 and packaged into corresponding portions of training datasets 180 using any of the exemplary processes described herein.

In some instances, and based on the parsed portions of process input data 192, executed process input engine 212 may that identify, and obtain or extract, one or more of the input feature values from one or more of data records maintained within subset 216 of consolidated data records 214 and associated with temporal intervals disposed within the extraction interval $\Delta t_{extract}$, as described herein. Executed process input engine 212 may perform operations that package the obtained, or extracted, input feature values within a corresponding one of input datasets 228, such as input dataset 230 associated with the delinquent financial product associated with account identifier 208, in accordance with their respective, specified sequences or positions. Further, in some examples, and based on the parsed portions of process input data 192, executed process input engine 212 may perform operations that compute, determine, or derive one or more of the input features values based on elements of data extracted or obtained from the additional ones of consolidated data elements 222, such as, but not limited to, one or more of the computed, determined, or derived feature values described herein. Executed process input engine 212 may perform operations that package each of the computed, determined, or derived input feature values into portions of input dataset 230 in accordance with their respective, specified sequences or positions.

Through an implementation of these exemplary processes, executed process input engine 212 may populate an input dataset associated with the delinquent financial product and the late-stage delinquency event associated element 206 of delinquent product data 202, such as input dataset 230 of input datasets 228, with input feature values obtained or extracted from, or computed, determined or derived from element of data within, the data records of subset 216.

Further, in some instances, executed process input engine 212 may also perform any of the exemplary processes described herein to generate, and populate with input feature values, an additional one of input datasets 228 for each of the delinquent financial products, and late-stage delinquency events, identified and characterized by additional, or alternate, elements of delinquent product data 202. Executed process input engine 212 may package each of the customer-specific input datasets within input datasets 228, and executed process input engine 212 may provide input datasets 228 as an input to a predictive engine 232 executed by the one or more processors of FI computing system 130.

As illustrated in FIG. 2A, executed predictive engine 232 may perform operations that obtain, from consolidated data store 144, process parameter data 190 that includes one or more model parameters of the adaptively trained, gradient-boosted, decision-tree process. For example, and as described herein, the model parameters included within process parameter data 194 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters).

In some examples, and based on portions of process parameter data 190, executed predictive engine 232 may perform operations that establish a plurality of nodes and a plurality of decision trees for the adaptively trained, gradient-boosted, decision-tree process, each of which receive, as inputs (e.g., "ingest"), corresponding elements of input datasets 228. Further, and based on the execution of predictive engine 232, and on the ingestion of input datasets 228 by the established nodes and decision trees of the adaptively trained, gradient-boosted, decision-tree process, FI computing system 130 may perform operations that apply the adaptively trained, gradient-boosted, decision-tree process to each of the input datasets of input datasets 228, including input dataset 230, and that generate an element of output data 234 associated with a corresponding one of input datasets 228, and as such, a corresponding one of the delinquent financial products, and the late-stage delinquencies, identified and characterized by the elements of delinquent product data 202. Each of the generated elements of output data 234 may associate the identifier of a corresponding one the delinquent financial products with a data structure (e.g., a two-dimensional array) that associates, or links together, identifiers of a plurality of candidate third-party collections agencies (e.g., the alphanumeric identifiers described herein) with corresponding class identifiers indicative of an expected occurrence of a corresponding one of the targeted classes of recovery events, as described herein.

As illustrated in FIG. 2A, executed predictive engine 232 may provide the generated elements of output data 234 (e.g., either alone, or in conjunction with corresponding ones of input datasets 228) as an input to a post-processing engine 236 executed by the one or more processors of FI computing system 130. In some instances, and upon receipt of the generated elements of output data 234 (e.g., and additionally, or alternatively, the corresponding ones of input datasets 228), executed post-processing engine 236 may perform operations that package corresponding elements of output data 234, either individually or in conjunction with corresponding ones of input datasets, into respective portions of response data 240. As illustrated in FIG. 2A, executed post-processing engine 236 may perform operations that cause FI computing system 130 may perform operations that transmit all, or a selected portion of, the elements of response data 240 across network 120 to collections system 203.

By way of example, and as described herein, the plurality of targeted classes of recovery events may include, among other things, (ii) a first targeted recovery class indicative of a predicted likelihood that a corresponding one of the third-party collections agencies will fail to recovery any portion of the past-due amount during the temporal assignment period (e.g., a "no-recovery" class); (ii) a second targeted recovery class indicative of a predicted likelihood that a corresponding one of the third-party collections agencies will recover less than a first threshold percentage of the past-due amount during the temporal assignment period (e.g., a "low-recovery" class); (iii) a third targeted recovery class indicative of a predicted likelihood that a corresponding one of the third-party collections agencies will recover between the first threshold percentage and a second threshold percentage of the past-due amount during the temporal assignment period (e.g., a "medium-recovery" class); and (iv) a fourth targeted recovery class indicative of a predicted likelihood that a corresponding one of the third-party collections agencies will recover greater than second threshold percentage of the past-due amount during the temporal assignment period (e.g., a "high-recovery" class). Further, in some instances, each of the plurality of targeted classes of recovery events may be associated with, and identified by, a unique alphanumeric class identifier of each of the plurality of targeted classes of recovery events, e.g., a numerical value of zero, unity, two, or three associated with respective ones of the no-, low-, medium-, and high-recovery classes, as described herein.

In some instances, output data elements 238 of output data 234 may be associated with the delinquent financial product, and corresponding late-stage delinquency, identified by account identifier 208 within element 206 of delinquent product data 202. As illustrated in FIG. 2A, output data elements 238 may include account identifier 208 along with addition data, such as data structure 242, that associates, or links together, identifiers of the candidate third-party collections agencies (e.g., the alphanumeric identifiers specified within targeting data 177 described herein) with corresponding ones of the unique, alphanumeric class identifiers indicative of an expected occurrence of a corresponding one of the targeted classes of recovery events. By way of example, the plurality of candidate third-party collections agencies may include four distinct agencies associated with alphanumeric agency identifiers $TPCA_1$, $TPCA_2$, $TPCA_3$, and $TPCA_4$, respectively. Further, in some examples, data structure 242 may associate alphanumeric agency identifiers $TPCA_1$ and $TPCA_4$ with alphanumeric class identifiers of zero, which indicates an expected occurrence of a "no-recovery" event if the financial institution were to assign the delinquent financial product associated with account identifier 208 to either the first or fourth ones of the plurality of candidate third-party collections agencies.

Further, as illustrated in FIG. 2A, data structure 242 may also associate alphanumeric agency identifier $TPCA_3$ with alphanumeric class identifiers of unity, which indicates an expected occurrence of a "low-recovery" event if the financial institution were to assign the delinquent financial product associated with account identifier 208 to the third one of the plurality of candidate third-party collections agencies (e.g., the third one of the candidate third-party collections agencies would recover less than the first threshold percentage of the past-due balance of the delinquent financial product). Additionally in some examples, data structure 242 may also associate alphanumeric agency identifier $TPCA_2$ with alphanumeric class identifiers of three, which indicates an expected occurrence of a "high-recovery" event if the financial institution were to assign the delinquent financial product associated with account identifier 208 to the second one of the candidate third-party collections agencies (e.g., the second one of the candidate third-party collections agencies would recover greater than the second threshold percentage of the past-due balance of the delinquent financial product). The disclosed embodiments are, however, not limited to, these exemplary number of third-party collections agencies, and in other instance, targeting data 177 may identify any additional, or alternate number of third-party collections agencies, and data structure 242 may associate alphanumeric agency identifiers identifying these additional, or alternate, third-party collections agencies with corresponding ones of the alphanumeric class identifiers, which characterize an expected occurrence of a corresponding one of the no-, low-, medium-, and high-recovery events involving the delinquent financial product.

In some instances, executed post-processing engine 236 may perform operations that package account identifier 208 of the delinquent financial product and data structure 242, which associates the identifier of each of the candidate third-party collections agencies with corresponding ones of the unique, alphanumeric class identifiers indicative of expected occurrences of the targeted classes of recovery events, to data record 244 of response data 240. Executed post-processing engine 236 may also perform operations that cause FI computing system 130 to transmit data record 244 across network 120 to collections system 203, e.g., based on system identifier 211 maintained within element 206 of delinquent product data 202. Further, although not illustrated in FIG. 2A, executed post-processing engine 236 may also perform these exemplary operations to package account identifiers of additional, or alternate, ones of the delinquent financial products, and corresponding data structures characterizing the expected occurrence of a corresponding one of the no-, low-, medium-, and high-recovery events involving the additional or alternate delinquent financial product and respective ones of the predetermined set of the third-party collections agencies, into a corresponding data record of response data 240, which FI computing system 130 may broadcast across network 120 to collections system 203.

Figure 2B:
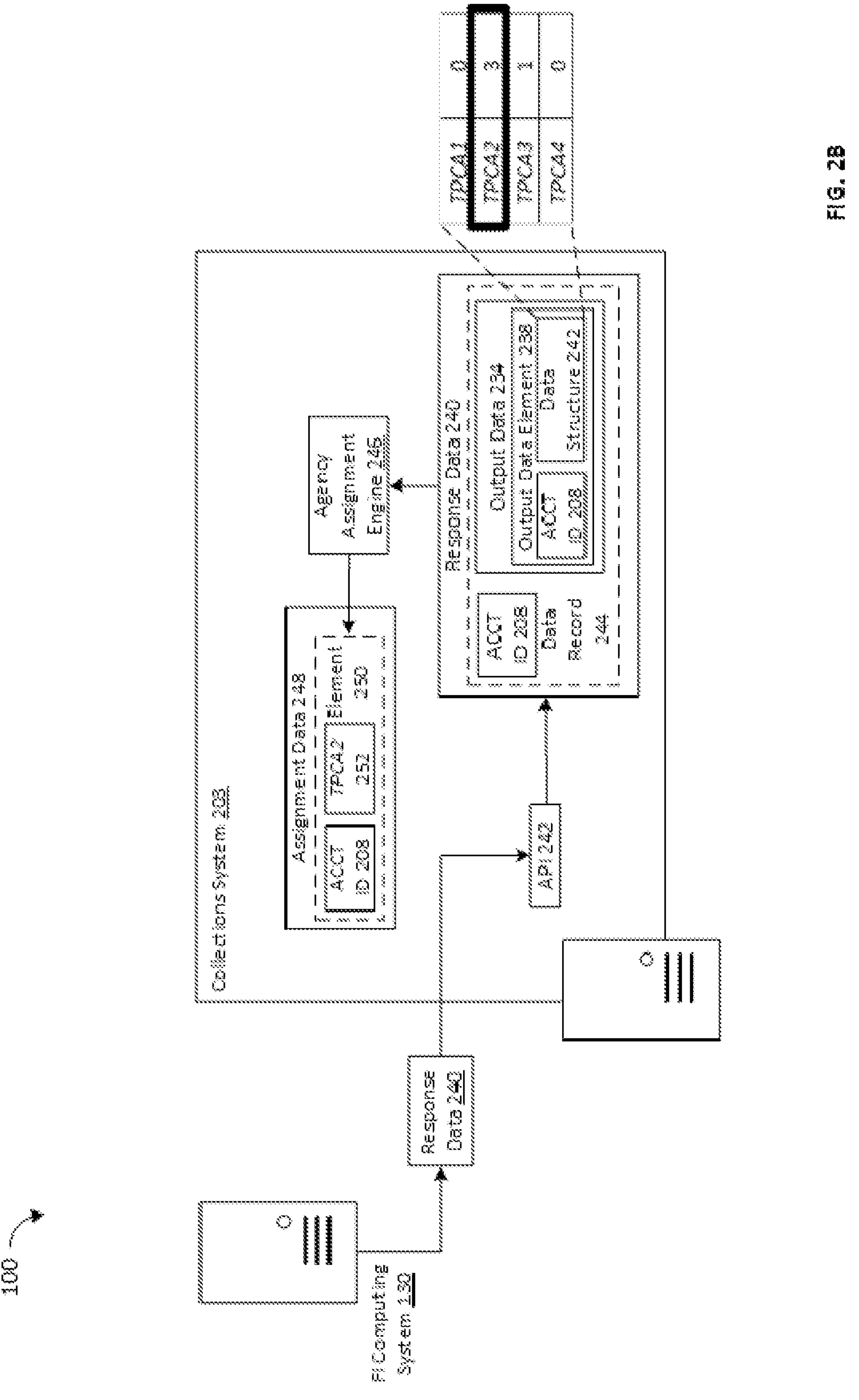

Referring to FIG. 2B, a programmatic interface associated with and maintained by collections system 203, such as application programming interface (API) 242, may receive the data records of response data 240, and may route the data records of response data 240 to an agency assignment engine 246 executed by the one or more processors of collections system 203. As described herein, each of the data records of response data 240 may associate together an account identifier of a delinquent financial product (e.g., associated with a corresponding late-stage delinquency event) and a corresponding data structure that characterizes an expected occurrence of a corresponding one of the targeted no-, low-, medium-, and high-recovery events during an assigned of the delinquent financial product to a respective ones of the predetermined set of the third-party collections agencies.

By way of example, and as described herein, a no-recovery event may occur when a third-party collections agency fails to recover any of a past-due balance associated with a delinquent financial product during a corresponding assignment period, a low-recovery event may occur when a third-party collections agency recovers less that a first threshold percentage of a past-due balance associated with a delinquent financial product during a corresponding assignment period, a medium-recovery event may occur when a third-party collections agency recovers between the first threshold percentage and a second threshold percentage of a past-due balance associated with a delinquent financial product during a corresponding assignment period, and a high-recovery event may occur when a third-party collections agency recovers greater than the second threshold percentage of a past-due balance associated with a delinquent financial product during a corresponding assignment period. Further, each of the plurality of targeted classes of recovery events may be associated with, and identified by, a unique alphanumeric class identifier of each of the plurality of targeted classes of recovery events, e.g., a numerical value of zero, unity, two, or three associated with respective ones of the no-, low-, medium-, and high-recovery classes, as described herein.

Referring back to FIG. 2B, executed agency assignment engine 246 may perform operations that parse each of the data records of response data 240 to obtain an account identifier of a corresponding one of the delinquent financial products (associated with a corresponding late-stage delinquency event) and a data structure characterizing an expected occurrence of a corresponding one of the no-, low-, medium-, and high-recovery events involving a potential assignment of the corresponding, delinquent financial product to respective ones of the predetermined set of the third-party collections agencies. In some instances, and for a particular one of the delinquent financial products, executed agency assignment engine 246 may parse the associated data structure, and obtain an alphanumeric identifier of a corresponding one of the third-party collection agencies characterized by an expected occurrence of high-recovery event involving the particular delinquent financial product. Executed agency assignment engine 246 may elect to assign the particular delinquent financial product to the corresponding one of the third-party collection agencies characterized by an expected occurrence of high-recovery event, e.g., as an initial assignment, or as a subsequent re-assignment, in an effort to increase a likelihood that a substantial portion of the initial past-due amount associated with the particular delinquent financial product, or any remaining portion of the past-due balance, will be recovered by the corresponding one of the third-party collection agencies during the initial, or subsequent, assignment period. In some instances, executed agency assignment engine 246 may perform operations that generate an element of assignment data 248 that includes the account identifier of the particular delinquent financial product and the alphanumeric identifier of the corresponding one of the third-party collection agencies, which confirms the assignment of the past-due balance of the particular delinquent financial product to the corresponding one of the third-party collection agencies, e.g., for recovery during the initial, or subsequent, assignment period.

By way of example, output data elements 238 may include account identifier 208 of a corresponding one of the delinquent financial products (e.g., the delinquent credit-card account, as described herein) and along with data structure 242, which associates, or links together, identifiers of the plurality of candidate third-party collections agencies (e.g., the alphanumeric identifiers specified within targeting data 177 described herein) with corresponding ones of the unique, alphanumeric class identifiers indicative of an expected occurrence of a corresponding one of the targeted classes of recovery events. By way of example, the plurality of candidate third-party collections agencies may include four distinct agencies associated with alphanumeric agency identifiers $TPCA_1$, $TPCA_2$, $TPCA_3$, and $TPCA_4$, respectively.

In some examples, illustrated in FIG. 2B, data structure 242 may associate alphanumeric agency identifiers $TPCA_1$ and $TPCA_4$ with alphanumeric class identifiers of zero, which indicates an expected occurrence of a "no-recovery" event if the financial institution were to assign the delinquent financial product associated with account identifier 208 to either the first or fourth ones of the candidate third-party collections agencies. Further, as illustrated in FIG. 2B, data structure 242 may also associate alphanumeric agency identifier $TPCA_3$ with alphanumeric class identifiers of unity, which indicates an expected occurrence of a "low-recovery" event if the financial institution were to assign the delinquent financial product associated with account identifier 208 to the third one of the candidate third-party collections agencies (e.g., the third one of the plurality of candidate third-party collections agencies would recover less than the first threshold percentage of the past-due balance of the delinquent financial product). Additionally in some examples, data structure 242 may also associate alphanumeric agency identifier $TPCA_2$ with alphanumeric class identifiers of three, which indicates an expected occurrence of a "high-recovery" event if the financial institution were to assign the delinquent financial product associated with account identifier 208 to the second one of the plurality of candidate third-party collections agencies (e.g., the second one of the candidate third-party collections agencies would recover greater than the second threshold percentage of the past-due balance of the delinquent financial product).

Based on a determination that a potential assignment of the delinquent credit-card account to the second one of the candidate third-party collections agencies associated with alphanumeric agency identifier $TPCA_2$, executed agency assignment engine 246 may elect to assign delinquent credit-card account to the second one of the candidate third-party collections agencies during an initial, or a subsequent, assignment period. In some instances, executed agency assignment engine 246 may perform operations that generate an element 250 of assignment data 248 that includes account identifier 208 of the delinquent credit-card account and an alphanumeric identifier 252 (e.g., alphanumeric agency identifier $TPCA_2$) of the second one of the candidate third-party collections agencies, and store element 250 within a corresponding portion of assignment data 248. As described herein, element 250 may confirm the assignment of the past-due balance of the delinquent credit-card account to the second one of the candidate third-party collections agencies, e.g., for recovery during the initial, or subsequent, assignment period.

Figure 3:
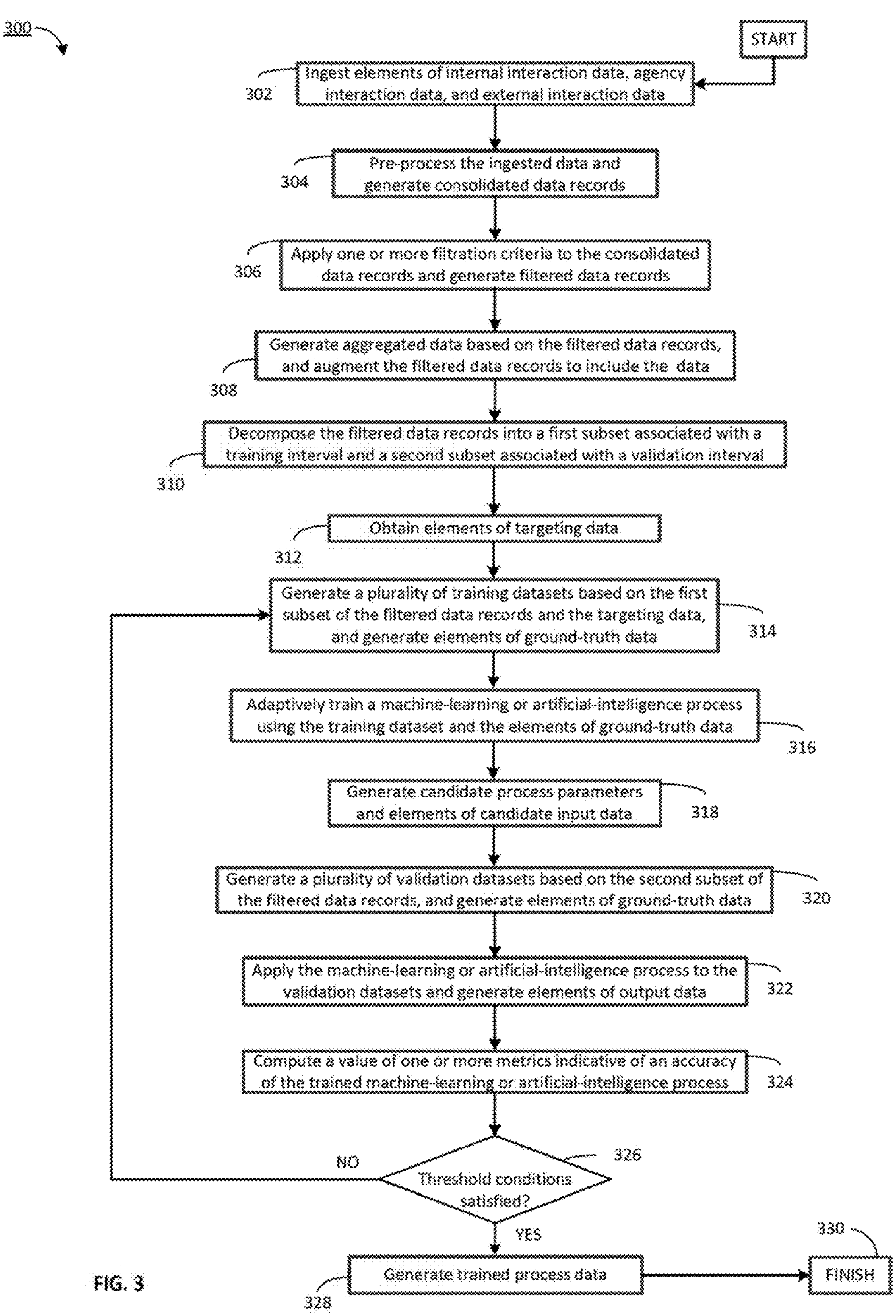
FIG. 3 is a flowchart of an exemplary process for adaptively training a machine learning or artificial intelligence process, in accordance with some exemplary embodiments.

FIG. 3 is a flowchart of an exemplary process 300 for adaptively training a machine learning or artificial intelligence process to predict, for each of a plurality of candidate third-party collections agencies, an expected occurrence of one of a plurality of targeted classes of recovery events involving a delinquent financial product during a future temporal interval and using validation data associated with a second, and distinct, prior temporal interval, in accordance with the disclosed exemplary embodiments. By way of example, the delinquent financial product may include an unsecured credit product issued by the financial institution to the customer, such as, but not limited to, a credit-card account, an unsecured personal loan, or unsecured line-of-credit. Further, and described herein, the machine-learning or artificial-intelligence process may include an ensemble or decision-tree process, such as a gradient-boosted decision-tree process (e.g., the XGBoost model), and the training and validation datasets may include, but are not limited to, values of adaptively selected features obtained, extracted, or derived from the elements of customer profile, account, transaction, delinquency, third-party agency, and/or credit-bureau data characterizing corresponding ones of the customers of the financial institution and maintained within one or more filtered data records of consolidated data store 144 (e.g., from data elements maintained within the discrete data records of filtered data records 154 and the filtered data records 164).

In some examples, and as described herein, the plurality of targeted classes of recovery events may include, among other things, (ii) a first targeted recovery class indicative of a predicted likelihood that a corresponding one of the third-party collections agencies will fail to recovery any portion of the past-due amount during the temporal assignment period (e.g., a "no-recovery" class); (ii) a second targeted recovery class indicative of a predicted likelihood that a corresponding one of the third-party collections agencies will recover between less that a first threshold percentage of the past-due amount during the temporal assignment period (e.g., a "low-recovery" class); (iii) a third targeted recovery class indicative of a predicted likelihood that a corresponding one of the third-party collections agencies will recover between the first threshold percentage and a second threshold percentage of the past-due amount during the temporal assignment period (e.g., a "medium-recovery" class); and (iv) a fourth targeted recovery class indicative of a predicted likelihood that a corresponding one of the third-party collections agencies will recover greater than the second threshold percentage of the past-due amount during the temporal assignment period (e.g., a "high-recovery" class). Further, each of the plurality of targeted classes of recovery events may be associated with a unique alphanumeric identifier of, such as, but not limited to, a numerical value of zero, unity, two, or three associated with respective ones of the no-, low-, medium-, and high-recovery classes. In some instances, one or more computing systems, such as, but not limited to, one or more of the distributed components of FI computing system 130, may perform one or more of the steps of exemplary process 300, as described herein.

Referring to FIG. 3, FI computing system 130 may establish a secure, programmatic channel of communication with one or more source computing systems, such as source systems 102 of FIG. 1A, and may perform operations to obtain, from the source computing systems, elements of internal interaction data, agency interaction data, and external interaction data that identify and characterize one or more customers of the financial institution during corresponding temporal intervals (e.g., in step 302 of FIG. 3). FI computing system 130 may also perform operations that store (or ingest) the obtained elements of internal and external customer data within one or more accessible data repositories, such as aggregated data store 132 (e.g., also in step 302 of FIG. 3). In some instances, FI computing system 130 may perform the exemplary processes described herein to obtain and ingest the elements of elements of internal and external customer data in accordance with a predetermined temporal schedule (e.g., on a monthly basis, on a daily basis at a predetermined time, etc.), or a continuous streaming basis, across the secure, programmatic channel of communication.

Further, FI computing system 130 may perform any of the exemplary processes described herein to pre-process the ingested elements of internal interaction data, agency interaction data, and external interaction data (e.g., the elements of customer profile, account, transaction, delinquency, third-party agency, and/or credit bureau data described herein) and generate one or more consolidated data records (e.g., in step 304 of FIG. 3). As described herein, the FI computing system 130 may store each of the consolidated data records within one or more accessible data repositories, such as consolidated data store 144 (e.g., also in step 304 of FIG. 3).

For example, and as described herein, each of the consolidated data records may be associated with a particular one of the business customers, and may include a customer identifier associated with the particular customer (e.g., an alphanumeric character string, etc.), a temporal interval that identifies a corresponding temporal interval, and further, an account identifier of a particular financial held by the customer during the temporal interval (e.g., a portion of a tokenized account number, etc.). Further, and in addition to the customer, temporal, and account identifiers, each of the consolidated data records may also include one or more consolidated elements of customer profile, account, transaction, delinquency, third-party agency or credit-bureau data that characterize the particular customer during the corresponding temporal interval associated with the temporal identifier.

In some instances, FI computing system 130 may perform any of the exemplary processes described herein to apply one or more filtration criteria to each of the consolidated data records, and to generate corresponding filtered data records that are consistent with, and satisfy, each of the applied filtration criteria (e.g., in step 306 of FIG. 1). As described herein, each of the filtered data records may be associated with a corresponding one of the business customers, and may include a corresponding pair of a customer and temporal identifiers, such as those described herein. Further, and in addition to the corresponding pair of customer and temporal identifiers, each of the filtered data records may also include one or more of the consolidated elements of customer profile, account, transaction, collections, third-party agency or credit-bureau data described herein, which characterize the corresponding one of the business customers during the corresponding temporal interval associated with the temporal identifier.

By way of example, the filtration criteria may include one or more of the product-, collections-, and performance specific filtration criteria described herein, and each of the filtered data records may identify, and characterize, a corresponding one of the customers of the financial institution that holds an unsecured credit product (e.g., the particular financial product) issued by the financial institution, and that is associated a corresponding delinquency event involving the unsecured credit product. FI computing system 130 may store each of the filtered data records within one or more accessible data repositories, such as consolidated data store 144 (e.g., also in step 306 of FIG. 3).

FI computing system 130 may also perform any of the exemplary processes described herein to access each of the filtered data records, and based on the consolidated data elements maintained within each of the filtered data records, generate one or more elements of aggregated account, transaction, delinquency, third-party agency, or credit-bureau data that characterize the corresponding one of the customers during the corresponding temporal interval (e.g., in step 308 of FIG. 3). FI computing system 130 may also perform operations that augment each of the filtered data records to include the corresponding elements of aggregated account, transaction, and agency data (e.g., also in step 308 of FIG. 3).

In some instances, FI computing system 130 may perform any of the exemplary processes described herein to decompose the filtered data records into (i) a first subset of the consolidated data records having temporal identifiers associated with a first prior temporal interval (e.g., the training interval $\Delta t_{training}$, as described herein) and (ii) a second subset of the filtered data records having temporal identifiers associated with a second prior temporal interval (e.g., the validation interval $\Delta t_{validation}$, as described herein), which may be separate, distinct, and disjoint from the first prior temporal interval (e.g., in step 310 of FIG. 3). By way of example, portions of the filtered data records within the first subset may be appropriate to train adaptively the machine-leaning or artificial process (e.g., the gradient-boosted decision model described herein) during the training interval $\Delta t_{training}$, and portions of the filtered records within the second subset may be appropriate to validating the adaptively trained gradient-boosted decision model during the validation interval $\Delta t_{validation}$.

In some instances, FI computing system 130 may perform any of the exemplary processes described herein to obtain elements of targeting data that identify and characterize not only the targeted classes of recovery events, but also the candidate third-party collections agencies available to receive assignments of delinquent financial products (e.g., in step 312 of FIG. 3). Further, FI computing system 130 may perform operations, described herein, that generate a plurality of training datasets based on elements of data obtained, extracted, or derived from all or a selected portion of the first subset of the filtered data records, and further, based on the obtained elements of the targeting data (e.g., in step 314 of FIG. 3). In some instances, each of the plurality of training datasets may be associated with a delinquent financial product (e.g., a delinquent, unsecured credit product, as described herein) and further, with an assignment of that delinquent financial product to a corresponding one of a predetermined set of third-party collection agencies (e.g., associated with a corresponding one of the alphanumeric identifiers, as described herein).

Each of the plurality of training datasets may include, among other things, an account identifier of the corresponding, delinquent financial product (e.g., the portion of the tokenized account number, as described herein), the alphanumeric identifier of the corresponding, third-party collections agency, an alphanumeric identifier of the corresponding customer, temporal data characterizing a time or date of the assignment of the delinquent financial product to the corresponding, third-party collections agency (e.g., that establishes temporal prediction point $t_{pred}$ during the current temporal interval), and/or sequence data characterizing a position of the assignment within an assignment lifecycle (e.g., initial, second, subsequent, etc.). Each of the plurality of training datasets 180 may also include elements of data (e.g., feature values described herein) that identify and characterize interactions of the corresponding customer with the financial institution and with other financial institutions, that identify or characterize the delinquent financial product or an occurrence of a delinquency involving the delinquent financial product and the corresponding customer, and/or that characterize a performance of a one or more third-party collections agencies, including the assigned, third-party collections agency, during a temporal interval disposed prior to the corresponding temporal interval, e.g., prior extraction interval $\Delta t_{extract}$.

Further, FI computing system 130 may also perform any of the exemplary processes described herein to generate an element of ground-truth data associated with each of the plurality of training datasets (e.g., also in step 314 of FIG. 3). By way of example, the element of ground-truth data associated with each of the plurality of training datasets may be indicative of an actual occurrence of one of the targeted classes of recovery events involving a corresponding delinquent financial product held by a corresponding customer, and assigned to a corresponding, third-party collections agency, during the target temporal interval $\Delta t_{target}$.

Based on the plurality of training datasets and the corresponding elements of ground-truth data, and in accordance with the elements of targeting data, FI computing system 130 may also perform any of the exemplary processes described herein to train adaptively the machine-learning or artificial-intelligence process (e.g., the gradient-boosted decision-tree process described herein) to predict, for each of the plurality of candidate third-party collections agencies specified within the targeting data, an expected occurrence of one of a plurality of targeted classes of recovery events involving a delinquent financial product held by a customer of the financial institution during a future temporal interval (e.g., in step 316 of FIG. 3). The delinquent financial product may correspond to an unsecured credit product issued by the financial institution, such as an unsecured credit product, and the future temporal interval may include, but is not limited to, a temporal assignment period of corresponding ones of the plurality of candidate third-party collections agencies (e.g., up to four-hundred days). For example, and as described herein, FI computing system 130 may perform operations that establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets, and that adaptively train the gradient-boosted, decision-tree process against the elements of training data included within each of the plurality of the training datasets.

In some examples, the distributed components of FI computing system 130 may perform any of the exemplary processes described herein in parallel to establish the plurality of nodes and a plurality of decision trees for the gradient-boosted, decision-tree process, and to adaptively train the gradient-boosted, decision-tree process against the elements of training data included within each of the plurality of the training datasets. The parallel implementation of these exemplary adaptive training processes by the distributed components of FI computing system 130 may, in some instances, be based on an implementation, across the distributed components, of one or more of the parallelized, fault-tolerant distributed computing and analytical protocols described herein.

Through the performance of these adaptive training processes, FI computing system 130 may compute one or more candidate process parameters that characterize the adaptively trained machine-learning or artificial-intelligence process, such as, but not limited to, candidate process parameters for the adaptively trained, gradient-boosted, decision-tree process described herein (e.g., in step 318 of FIG. 3). In some instances, and for the adaptively trained, gradient-boosted, decision-tree process, the candidate process parameters included within candidate model data may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, and based on the performance of these adaptive training processes, FI computing system 130 may perform any of the exemplary processes described herein to generate candidate input data, which specifies a candidate composition of an input dataset for the adaptively trained machine-learning or artificial intelligence process, such as the adaptively trained, gradient-boosted, decision-tree process (e.g., also in step 318 of FIG. 3).

Further, FI computing system 130 may perform any of the exemplary processes described herein to access the second subset of the consolidated data records, and to generate a plurality of validation subsets having compositions consistent with the candidate input data (e.g., in step 320 of FIG. 3). As described herein, each of the plurality of validation datasets may be associated with a delinquent financial product (e.g., a delinquent, unsecured credit product, as described herein) and further, with an assignment of that delinquent financial product to a corresponding one of a predetermined set of third-party collection agencies (e.g., associated with a corresponding one of the alphanumeric identifiers, as described herein) during a corresponding temporal interval, e.g., within the validation interval $\Delta t_{validation}$ described herein.

Each of the plurality of validation datasets may include an account identifier of the corresponding, delinquent financial product (e.g., the portion of the tokenized account number, as described herein), an alphanumeric identifier of the corresponding, third-party collections agency, an alphanumeric identifier of the corresponding customer, temporal data characterizing a time or date of the assignment of the delinquent financial product to the corresponding, third-party collections agency (e.g., that establishes temporal prediction point $t_{pred}$ during the temporal interval), and/or sequence data characterizing a position of the assignment within an assignment lifecycle (e.g., initial, second, subsequent, etc.). Further, each of the plurality of validation datasets may also include elements of data consistent with the candidate input data (e.g., feature values described herein) that identify and characterize interactions of the corresponding customer with the financial institution and with other financial institutions, that identify or characterize the delinquent financial product or an occurrence of a delinquency involving the delinquent financial product and the corresponding customer, and/or that characterize a performance of a one or more third-party collections agencies, including the assigned, third-party collections agency, during a temporal interval disposed prior to the corresponding temporal interval, e.g., prior extraction interval $\Delta t_{extract}$.

Further, FI computing system 130 may also perform any of the exemplary processes described herein to generate an element of ground-truth data associated with each of the plurality of validation datasets (e.g., also in step 320 of FIG. 3). By way of example, the element of ground-truth data associated with each of the plurality of training datasets may be indicative of an actual occurrence of one of the targeted classes of recovery events involving a corresponding delinquent financial product held by a corresponding customer, and assigned to a corresponding, third-party collections agency, during the target temporal interval $\Delta t_{target}$.

In some instances, FI computing system 130 may perform any of the exemplary processes described herein to apply the adaptively trained machine-learning or artificial intelligence process (e.g., the adaptively trained, gradient-boosted, decision-tree process described herein) to respective ones of the validation datasets, and to generate corresponding elements of output data based on the application of the adaptively trained machine-learning or artificial intelligence process to the respective ones of the validation datasets (e.g., in step 322 of FIG. 3). As described herein, each of the generated elements of output data may be associated with a respective one of the validation datasets and as such, a corresponding one of the delinquent financial products and an assignment of that delinquent financial product to a corresponding one of the predetermined set of third-party collection agencies.

Further, and as described herein, each of the elements of output data may include, for a delinquent financial product associated with a corresponding one of the validation datasets, an identifier of the delinquent financial product (e.g., the portion of the tokenized account number), and data identifying and characterizing an expected occurrence of one of the plurality of targeted classes of recovery events that would result from an assignment of the delinquent financial product to corresponding ones of the plurality of candidate third-party collections agencies. For example, each of the plurality of targeted recovery classes may be associated with a corresponding class identifier (e.g., a numerical value of zero, unity, two, or three associated with respective ones of the no-, low-, medium-, and high-recovery classes, as described herein), and each of the elements of output data include the account identifier of the delinquent financial product and additional data, such as a two-dimensional array, that associates, or links together, each of the identifiers of the candidate third-party collections agencies (e.g., the alphanumeric identifiers described herein) with the corresponding class identifier indicative the expected occurrence of the corresponding one of the targeted classes of recovery events.

Further, and as described herein, the distributed components of FI computing system 130 may perform any of the exemplary processes described herein in parallel to validate the adaptively trained, gradient-boosted, decision-tree process described herein based on the application of the adaptively trained, gradient-boosted, decision-tree process (e.g., configured in accordance with the candidate process parameters) to each of the validation datasets. The parallel implementation of these exemplary adaptive validation processes by the distributed components of FI computing system 130 may, in some instances, be based on an implementation, across the distributed components, of one or more of the parallelized, fault-tolerant distributed computing and analytical protocols described herein.

In some examples, FI computing system 130 may perform any of the exemplary processes described herein to compute a value of one or more metrics that characterize a predictive capability, and an accuracy, of the adaptively trained machine-learning or artificial intelligence process (such as the adaptively trained, gradient-boosted, decision-tree process described herein) based on the generated elements of output data and corresponding ones of the validation datasets (e.g., in step 324 of FIG. 3), and to determine whether all, or a selected portion of, the computed metric values satisfy one or more threshold conditions for a deployment of the adaptively trained machine-learning or artificial intelligence process (e.g., in step 326 of FIG. 3). As described herein, and for the adaptively trained, gradient-boosted, decision-tree process, the computed metrics may include, but are not limited to, one or more recall-based values (e.g., "recall@5," "recall@10," "recall@20," etc.), one or more precision-based values for the adaptively trained, gradient-boosted, decision-tree process, a computed value of an area under curve (AUC) for a precision-recall (PR) curve or a computed value of an AUC for a receiver operating characteristic (ROC) curve associated with the adaptively trained, gradient-boosted, decision-tree process, and additionally, or alternatively, a computed value of a multiclass, one-versus-all area under curve (MAUC) computed for one or more of the training datasets.

Further, and as described herein, the threshold requirements for the adaptively trained, gradient-boosted, decision-tree process may specify one or more predetermined threshold values, such as, but not limited to, a predetermined threshold value for the computed recall-based values, a predetermined threshold value for the computed precision-based values, and/or a predetermined threshold value for the computed AUC or MAUC values. In some examples, FI computing system 130 may perform any of the exemplary processes described herein to establish whether one, or more, of the computed recall-based values, the computed precision-based values, or the computed AUC values exceed, or fall below, a corresponding one of the predetermined threshold values and as such, whether the adaptively trained, gradient-boosted, decision-tree process satisfies the one or more threshold requirements for deployment.

If, for example, FI computing system 130 were to establish that one, or more, of the computed metric values fail to satisfy at least one of the threshold requirements (e.g., step 326; NO), FI computing system 130 may establish that the adaptively trained machine-learning or artificial-intelligence process (e.g., the adaptively trained, gradient-boosted, decision-tree process) is insufficiently accurate for deployment and a real-time application to the elements of customer profile, account, transaction, collections, third-party agency or credit-bureau data described herein. Exemplary process 300 may, for example, pass back to step 314, and FI computing system 130 may perform any of the exemplary processes described herein to generate additional training datasets based on the elements of the consolidated data records maintained within the first subset.

Alternatively, if FI computing system 130 were to establish that each computed metric value satisfies threshold requirements (e.g., step 326; YES), FI computing system 130 may deem the machine-learning or artificial intelligence process (e.g., the gradient-boosted, decision-tree process described herein) adaptively trained and ready for deployment and real-time application to the elements of customer profile, account, transaction, collections, third-party or credit-bureau data described herein, and may perform any of the exemplary processes described herein to generate trained process data that includes the candidate process parameters and candidate input data associated with the of the adaptively trained machine-learning or artificial intelligence process (e.g., in step 328 of FIG. 3). Exemplary process 300 is then complete in step 330.

Figure 4:
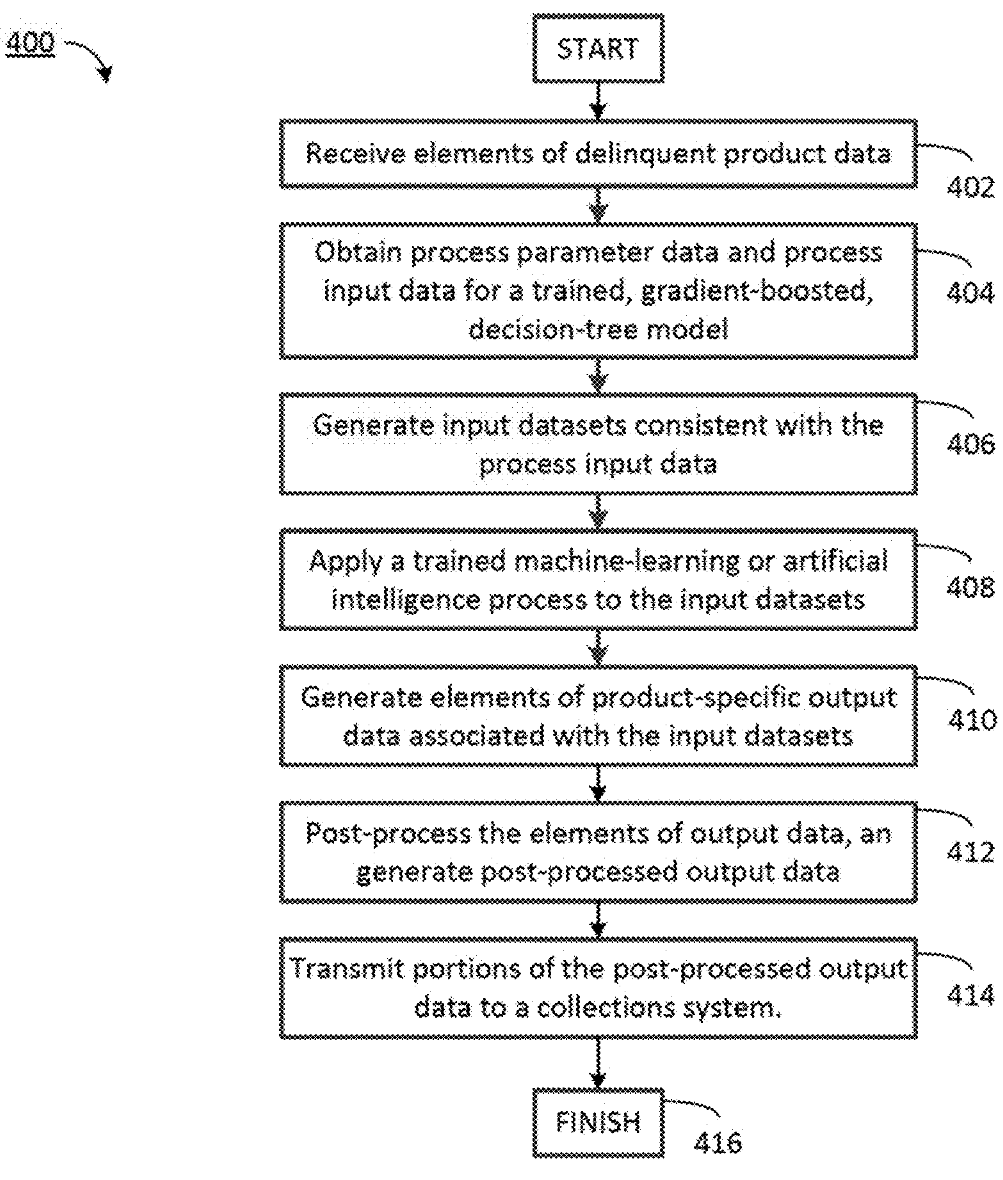
FIG. 4 is a flowchart of an exemplary process for predicting, in real-time, expected occurrences of targeted classes of recovery events during a future temporal interval, in accordance with some exemplary embodiments.

FIG. 4 is a flowchart of an exemplary process 400 for predicting, in real-time, an expected occurrence of one of a plurality of targeted classes of recovery events involving an assignment of a delinquent financial product to each of a plurality of candidate third-party collections agencies during a future temporal interval using adaptively trained machine-learning or artificial-intelligence processes, in accordance with the disclosed exemplary embodiments. As described herein, the delinquent financial product may include, among other things, a delinquent, unsecured credit product issued to a customer of the financial institution, and the delinquent financial product may be associated with an occurrence of a corresponding delinquency event characterized by a past due balance and a past-due period (e.g., a temporal interval between a current date and the due date of the missed payment). Further, and as described herein, the machine-learning or artificial-intelligence processes may include an ensemble or decision-tree process, such as a gradient-boosted decision-tree process (e.g., the XGBoost model), which may be trained adaptively to predict the expected occurrence of one of a plurality of targeted classes of recovery events involving the assignment of the delinquent financial product to each of a plurality of candidate third-party collections agencies during the future temporal interval By way of example, the targeted classes of recovery events may include, among other things, (ii) a first targeted recovery class indicative of a predicted likelihood that a corresponding one of the third-party collections agencies will fail to recovery any portion of the past-due amount during the temporal assignment period (e.g., a "no-recovery" class); (ii) a second targeted recovery class indicative of a predicted likelihood that a corresponding one of the third-party collections agencies will recover between less that a first threshold percentage of the past-due amount during the temporal assignment period (e.g., a "low-recovery" class); (iii) a third targeted recovery class indicative of a predicted likelihood that a corresponding one of the third-party collections agencies will recover between the first threshold percentage and a second threshold percentage of the past-due amount during the temporal assignment period (e.g., a "medium-recovery" class); and (iv) a fourth targeted recovery class indicative of a predicted likelihood that a corresponding one of the third-party collections agencies will recover greater than the second threshold percentage of the past-due amount during the temporal assignment period (e.g., a "high-recovery" class). In some instances, one or more computing systems, such as, but not limited to, one or more of the distributed components of FI computing system 130, may perform one or of the steps of exemplary process 400, as described herein.

Referring to FIG. 4, FI computing system 130 may perform any of the exemplary processes described herein to obtain elements of delinquent product data (e.g., in step 402 of FIG. 4). As described herein, each of the elements of delinquent product data may identify and characterize a delinquent financial product issued to a corresponding customer by the financial institution and involved in a delinquency event characterized by a corresponding past-due balance and a past-due period (e.g., a temporal interval between a current date and the due date of the missed payment). Each of the delinquency events may, for example, represent a late-stage delinquency event associated with multiple, missed monthly payments and a corresponding past-due period that exceeds the predetermined threshold period and as described herein, and responsive of the occurrence of the late-stage delinquency events, the financial institution may elect to assign each of the delinquent financial products to a corresponding one of plurality of candidate third-party collections agencies, e.g., as an initial assignment to recover the initial, past-due balance (including an initial principal amount, accused interest, imposed fees, etc.), or as a subsequent re-assignment to recover a past-due amount remaining from a prior assignment (including any remaining principal amount, additional accused interest and imposed fees, etc.). In some instances, FI computing system 130 may receive all, or a selected portion, of the elements of delinquent product data across network 120 from an additional computing system associated with the financial institution, such as, but not limited to, collections system 203 of FIGS. 2A and 2B. associated with the financial institution, and may store each of the elements of delinquent product data within a corresponding portion of a tangible, non-transitory memory, such as, but not limited to, aggregated data store 132 of FIG. 2A.

As described herein, each of the elements of delinquent product data may be associated with, and identify and characterize, a delinquent financial product issued to a corresponding customer by the financial institution and involved in a corresponding late-stage delinquency event. By way of example, and for a particular delinquent financial product (e.g., the delinquent, unsecured credit products described herein), the elements of delinquent product data may include, among other things, an account identifier of the particular delinquent financial product (e.g., a portion of a tokenized account number, etc.), a customer identifier of the corresponding customer holding the particular delinquent financial product (e.g., an alphanumeric authentication credential, etc.), elements of delinquency data that characterize a scope of the corresponding late-stage delinquency event involving the particular delinquent financial product (e.g., a value of the past-due balance or the past-due period, etc.), and a system identifier associated with collections system 203 (e.g., an Internet Protocol (IP) address, a media access control (MAC) address, etc.).

Referring back to FIG. 4, FI computing system 130 may perform any of the exemplary processes described herein to generate an input dataset associated with each of the delinquent financial products, and late-stage delinquency events associated with the discrete elements of delinquent product data, and to apply the adaptively trained, gradient-boosted, decision-tree process described herein to each of the input datasets, in accordance with a predetermined temporal schedule (e.g., on a daily basis, etc.), or in response to a detection of a triggering event. By way of example, the triggering event may correspond to a detected change in a composition of the elements of delinquent product data maintained within aggregated data store 132 (e.g., to an ingestion of additional elements of delinquent product data, etc.) or to a receipt of an explicit request received from collections system 203.

In some instances, and in accordance with the predetermined temporal schedule, or upon the detection of the triggering event, a process input engine 212 executed by FI computing system 130 may perform operations that access the elements of delinquent product data 202 maintained within aggregated data store 132, and that obtain the account identifier (e.g., identifying a corresponding one of the delinquent financial products) and the account identifier (e.g., identifying a corresponding customer) maintained within a corresponding one of the accessed elements of delinquent product data 202. For example, as illustrated in FIG. 2A, executed process input engine 212 may access element 206 of delinquent product data 202 (e.g., as maintained within aggregated data store 132) and obtain account identifier 208 of the corresponding delinquent financial product and customer identifier 209 of the customer holding the corresponding delinquent financial product.

By way of example, FI computing system 130 may perform any of the exemplary processes described herein to obtain one or more process parameters that characterize the adaptively trained machine-learning or artificial-intelligence process (e.g., the adaptively trained, gradient-boosted, decision-tree process described herein) and elements of process input data that specify a composition of an input dataset for the adaptively trained machine-learning or artificial-intelligence process (e.g., in step 404 of FIG. 4). In some instances, and for the adaptively trained, gradient-boosted, decision-tree process described herein, the one or more process parameters may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, the elements of process input data may specify the composition of the input dataset for the adaptively trained, gradient-boosted, decision-tree process, which not only identifies the elements of customer-specific data included within each input dataset (e.g., input feature values, as described herein), but also a specified sequence or position of these input feature values within the input dataset.

FI computing system 130 may also access the elements of delinquent product data that identify and characterize corresponding ones of the delinquent financial products, and may perform any of the exemplary processes described herein to generate, for each of the delinquent financial products, an input dataset having composition consistent with the elements of process input data (e.g., in step 406 of FIG. 4). By way of example, and as described herein, the elements of delinquent product data may include account identifiers associated with each of the delinquent financial products, and customer identifiers associated with the customers of the financial institution that hold these delinquent financial products. In some instances, FI computing system 130 may perform any of the exemplary processes described herein to access one or more consolidated data records (e.g., as maintained within consolidated data store 144 of FIG. 1) that include, or reference corresponding pairs account and customer identifiers associated with each of the elements of delinquent product data (and each of the delinquent financial products), and to generate the input dataset associated with each of the delinquent financial products based on the accessed consolidated data records and in accordance with the elements of process input data (e.g., also in step 406). Further, FI computing system 130 may perform operations, described herein to generate the input datasets for each of the delinquent financial products in accordance with a predetermined schedule (e.g., on a daily basis) or based on a detected occurrence of a triggering event.

Further, and based on the one or more obtained process parameters, FI computing system 130 may perform any of the exemplary processes described herein to apply the adaptively trained machine-learning or artificial-intelligence process (e.g., the adaptively trained, gradient-boosted, decision-tree process described herein) to each of the generated, product-specific input datasets (e.g., in step 408 of FIG. 4), and to generate a product-specific element of predicted output data associated with each of the product-specific input datasets (e.g., in step 410 of FIG. 4). For example, and based on the one or more obtained process parameters, FI computing system 130 may perform operations, described herein, that establish a plurality of nodes and a plurality of decision trees for the adaptively trained, gradient-boosted, decision-tree process, each of which receive, as inputs (e.g., "ingest"), corresponding elements of the customer-specific input datasets. Based on the ingestion of the input datasets by the established nodes and decision trees of the adaptively trained, gradient-boosted, decision-tree process, FI computing system 130 may perform operations that apply the adaptively trained, gradient-boosted, decision-tree process to each of the product-specific input datasets and that generate the product-specific elements of the output data associated with the customer-specific input datasets.

As described herein, each of the product-specific elements of the output data may be associated with a corresponding one of the delinquent financial products, and the late-stage delinquencies, which may be identified and characterized by a corresponding element of the delinquent product data. By way of example, and for the corresponding delinquent financial product (and the corresponding late-stage delinquency), the product-specific elements of the output data may include the account identifier of the corresponding delinquent financial product and additional data, such as a two-dimensional array, that associates, or links together, identifiers of the candidate third-party collections agencies (e.g., the alphanumeric identifiers described herein) with corresponding class identifiers indicative of the expected occurrence of a corresponding one of the targeted classes of recovery events during the future temporal interval, e.g., the initial, or subsequent, assignment period, as described herein.

In step 412 of FIG. 4, FI computing system 130 may also perform any of the exemplary processes described herein to post-process the product-specific elements of output data and, among other things, associated each of the product-specific elements of output data with a corresponding one of the system identifiers, e.g., as maintained in conjunction with corresponding ones of the account identifiers within the elements of customer data). Further, FI computing system 130 may also perform any of the exemplary processes described herein to generate elements of post-processed output data that include the associated elements of customer data and the elements of customer-specific output data (e.g., also in step 412 of FIG. 4).

Further, and based on the corresponding system identifier, FI computing system 130 may perform any of the exemplary processes described herein to transmit all, or a selected portion of, the elements of post-processed output data to a corresponding one of the additional computing systems associated with the financial institution, such as, but not limited to, collections system 203 (e.g., in step 414 of FIG. 4). As described herein, collections system 203 may receive a corresponding portion of the elements of post-processed output data from FI computing system 130, and one or more application programs executed by collections system 203 may perform operations that parse each of the elements of post-processed output data to obtain the account identifier of a corresponding one of the delinquent financial products (associated with a corresponding late-stage delinquency event) and the data structure characterizing an expected occurrence of a corresponding one of the no-, low-, medium-, and high-recovery events involving a potential assignment of the corresponding, delinquent financial product to respective ones of the predetermined set of the third-party collections agencies.

In some instances, and for a particular one of the delinquent financial products, collections system 203 may parse the associated data structure, and obtain an alphanumeric identifier of a corresponding one of the third-party collection agencies characterized by an expected occurrence of high-recovery event involving the particular delinquent financial product. Collections system 203 may elect to assign the particular delinquent financial product to the corresponding one of the third-party collection agencies characterized by an expected occurrence of high-recovery event, e.g., as an initial assignment, or as a subsequent re-assignment, in an effort to increase a likelihood that a substantial portion of the initial past-due amount associated with the particular delinquent financial product, or any remaining portion of the past-due balance, will be recovered by the corresponding one of the third-party collection agencies during the initial, or subsequent, assignment period. In some instances, collections system 203 may perform operations, described herein, that generate an element of assignment data that includes the account identifier of the particular delinquent financial product and the alphanumeric identifier of the corresponding one of the third-party collection agencies, which confirms the assignment of the past-due balance of the particular delinquent financial product to the corresponding one of the third-party collection agencies, e.g., for recovery during the initial, or subsequent, assignment period. Exemplary process 400 is then complete in step 418.

C. Exemplary Hardware and Software Implementations

Examples of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including application programming interfaces (APIs) 134 and 204, data ingestion engine 136, preprocessing engine 140, filtration engine 152, aggregation engine 157, training engine 172, training input module 176, adaptive training and validation module 182, process input engine 212, predictive engine 232, post-processing engine 236, and agency assignment engine 246, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" (e.g., the FI computing system and the device described herein) refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user (e.g., the customer or employee described herein), embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a memory storing instructions;

a communications interface; and at least one processor coupled to the memory and the communications interface, the at least one processor being configured to execute the instructions to:

receive, via the communications interface, an identifier associated with an occurrence of a first event from a computing system, and based on the received identifier, obtain elements of interaction data associated with the occurrence of the first event;

generate an input dataset based on the elements of interaction data;

establish a plurality of decision trees for a trained, gradient-boosted decision tree process based on corresponding elements of process data, and provision a corresponding element of the input dataset to an input node of each of the established decision trees;

based on the provisioning of the elements of the input dataset to the input nodes of the established decision trees, perform operations, in parallel across a plurality of distributed computing components interconnected across a computing network, that apply the trained gradient-boosted decision tree process to the input dataset and that generate, for each of a plurality of candidate event assignments, elements of output data indicative of an expected occurrence of a second event associated with a corresponding one of a plurality of targeted classes of events during a future temporal interval; and transmit at least a portion of the generated output data to the computing system via the communications interface, the computing system being configured to perform operations that assign the first event to a corresponding one of the candidate event assignments based on the elements of output data.

2. The apparatus of claim 1, wherein the at least one processor is further configured to execute the instructions to:

receive at least a portion of the interaction data from the computing system via the communications interface; and store the portion of the interaction data within the memory.

3. The apparatus of claim 1, wherein:

the interaction data is associated with occurrences of a plurality of first events; and the at least one processor is further configured to execute the instructions to:

generate a plurality of input datasets based on the interaction data, each of the plurality of input datasets being associated with a corresponding one of the first events;

apply the trained gradient-boosted decision tree process to each of the plurality of input datasets, and generate elements of the output data based on the application of the trained gradient-boosted decision tree process to each of the plurality of input datasets, each of the elements of output data being associated with the corresponding one of the first events, and each of the elements of output data indicating, for each of a plurality of candidate event assignments, the expected occurrence of the second event associated with the corresponding one of the plurality of targeted classes of events during the future temporal interval; and transmit at least a subset of the elements of output data to the computing system via the communications interface.

4. The apparatus of claim 1, wherein:

the future temporal interval comprises a temporal assignment period associated with the candidate event assignments;

the second event is associated with a candidate resolution of the first event during the temporal assignment period, the candidate resolution being associated with a value of a resolution parameter; and for each of the candidate event assignments, the elements of output data indicate a predicted likelihood that the corresponding resolution parameter value is disposed within a range of resolution parameter values associated with the corresponding one of the targeted classes of events.

5. The apparatus of claim 1, wherein the at least one processor is further configured to:

obtain (i) the process data comprising one or more parameters that characterize the trained gradient-boosted decision tree process and (ii) data that characterizes a composition of the input dataset;

generate the input dataset in accordance with the data that characterizes the composition; and apply the trained gradient-boosted decision tree process to the input dataset in accordance with the one or more parameters.

6. The apparatus of claim 5, wherein the at least one processor is further configured to:

based on the data that characterizes the composition, perform operations that at least one of extract a first feature value from the interaction data or compute a second feature value based on the first feature value; and generate the input dataset based on at least one of the extracted first feature value or the computed second feature value.

7. The apparatus of claim 1, wherein the at least one processor is further configured to execute the instructions to:

obtain elements of additional interaction data, each of the elements of the additional interaction data comprising a temporal identifier associated with a temporal interval;

based on the temporal identifiers, determine that a first subset of the elements of the additional interaction data is associated with a prior training interval, and that a second subset of the elements of the additional interaction data is associated with a prior validation interval; and generate a plurality of training datasets based corresponding portions of the first subset, and perform operations that train the gradient-boosted decision tree process based on the plurality of training datasets.

8. The apparatus of claim 7, wherein the at least one processor is further configured to execute the instructions to:

generate a plurality of validation datasets based on portions of the second subset;

apply the trained gradient-boosted decision tree process to the plurality of validation datasets, and generate additional elements of output data based on the application of the trained gradient-boosted decision tree process to the plurality of validation datasets;

compute one or more validation metrics based on the additional elements of output data; and based on a determined consistency between the one or more validation metrics and a threshold condition, validate the trained gradient-boosted decision tree process.

9. The apparatus of claim 1, wherein:

the first event comprises a delinquency event involving a delinquent product, and the targeted classes of events comprise a plurality of targeted classes of recovery events;

each of the candidate event assignments corresponds to a candidate agency assignment, and the second event is associated with a candidate resolution of the delinquency event during the future temporal interval, the candidate resolution being associated with a recovery rate; and for each of the candidate agency assignments, the elements of output data indicate a predicted likelihood that the recovery rate is disposed within a range of recovery rates associated with the corresponding one of the targeted classes of recovery events.

10. A computer-implemented method, comprising:

receiving, using at least one processor, an identifier associated with an occurrence of a first event from a computing system, and based on the received identifier, obtaining, using the at least one processor, elements of interaction data associated with the occurrence of the first event from a data repository;

generating, using the at least one processor, an input dataset based on the elements of interaction data;

establishing, using the at least one processor, a plurality of decision trees for a trained, gradient-boosted, decision-tree process based on corresponding elements of process data, and provisioning, using the at least one processor, a corresponding element of the input dataset to an input node of each of the established decision trees;

based on the provisioning of the elements of the input dataset to the input nodes of the established decision trees, performing operations, in parallel across a plurality of distributed computing components interconnected across a computing network, using the at least one processor, that apply the trained gradient-boosted decision tree process to the input dataset and that generate, for each of a plurality of candidate event assignments, elements of output data indicative of an expected occurrence of a second event associated with a corresponding one of a plurality of targeted classes of events during a future temporal interval; and transmitting, using the at least one processor, at least a portion of the generated output data to the computing system, the computing system being configured to perform operations that assign the first event to a corresponding one of the candidate event assignments based on the elements of output data.

11. The computer-implemented method of claim 10, further comprising:

receiving, using the at least one processor, at least a portion of the interaction data from the computing system; and using the at least one processor, storing the portion of the interaction data within a data repository.

12. The computer-implemented method of claim 10, wherein:

the future temporal interval comprises a temporal assignment period associated with the candidate event assignments;

the second event is associated with a candidate resolution of the first event during the temporal assignment period, the candidate resolution being associated with a value of a resolution parameter; and for each of the candidate event assignments, the elements of output data indicate a predicted likelihood that the corresponding resolution parameter value is disposed within a range of resolution parameter values associated with the corresponding one of the targeted classes of events.

13. The computer-implemented method of claim 10, wherein:

the computer-implemented method further comprises, using the at least one processor, obtaining (i) the process data comprising one or more parameters that characterize the trained gradient-boosted decision tree process and (ii) data that characterizes a composition of the input dataset;

generating the input dataset comprises generating the input dataset in accordance with the data that characterizes the composition; and the computer-implemented method further comprises applying, using the at least one processor, the trained gradient-boosted decision tree process to the input dataset in accordance with the one or more parameters.

14. The computer-implemented method of claim 13, wherein:

the computer-implemented method further comprises, based on the data that characterizes the composition, performing operations, using the at least one processor, that at least one of extract a first feature value from the interaction data or compute a second feature value based on the first feature value; and generating the input dataset comprises generating the input dataset based on at least one of the extracted first feature value or the computed second feature value.

15. The computer-implemented method of claim 10, further comprising:

obtaining, using the at least one processor, elements of additional interaction data, each of the elements of the additional interaction data comprising a temporal identifier associated with a temporal interval;

based on the temporal identifiers, determining, using the at least one processor, that a first subset of the elements of the additional interaction data is associated with a prior training interval, and that a second subset of the elements of the additional interaction data is associated with a prior validation interval; and using the at least one processor, generating a plurality of training datasets based corresponding portions of the first subset, and performing operations that train the gradient-boosted decision tree process based on the plurality of training datasets.

16. The computer-implemented method of claim 15, further comprising:

generating, using the at least one processor, a plurality of validation datasets based on portions of the second subset;

using the at least one processor, applying the trained gradient-boosted decision tree process to the plurality of validation datasets, and generating additional elements of output data based on the application of the trained gradient-boosted decision tree process to the plurality of validation datasets;

computing, using the at least one processor, one or more validation metrics based on the additional elements of output data; and based on a determined consistency between the one or more validation metrics and a threshold condition, validating the trained gradient-boosted decision tree process using the at least one processor.

17. The computer-implemented method of claim 10, wherein:

the first event comprises a delinquency event involving a delinquent product, and the targeted classes of events comprise a plurality of targeted classes of recovery events;

each of the candidate event assignments corresponds to a candidate agency assignment, and the second event is associated with a candidate resolution of the delinquency event during the future temporal interval, the candidate resolution being associated with a recovery rate; and for each of the candidate agency assignments, the elements of output data indicate a predicted likelihood that the recovery rate is disposed within a range of recovery rates associated with the corresponding one of the targeted classes of recovery events.

18. A tangible, non-transitory computer-readable medium storing instructions that, when executed by at least one processor, cause the at least one processor to perform a method, comprising:

receiving an identifier associated with an occurrence of a first event from a computing system, and based on the received identifier, obtaining elements of interaction data associated with the occurrence of the first event from a data repository;

generating an input dataset based on the elements of interaction data;

establishing a plurality of decision trees for a trained, gradient-boosted, decision-tree process based on corresponding elements of process data, and provisioning a corresponding element of the input dataset to an input node of each of the established decision trees;

based on the provisioning of the elements of the input dataset to the input nodes of the established decision trees, perform operations, in parallel across a plurality of distributed computing components interconnected across a computing network, that apply the trained gradient-boosted decision tree process to the input dataset and that generate, for each of a plurality of candidate event assignments, elements of output data indicative of an expected occurrence of a second event associated with a corresponding one of a plurality of targeted classes of events during a future temporal interval; and transmitting at least a portion of the generated output data to the computing system, the computing system being configured to perform operations that assign the first event to a corresponding one of the candidate event assignments based on the elements of output data.

19. The apparatus of claim 1, wherein the at least one processor is further configured to execute the instructions to perform operations that:

apply the trained gradient-boosted decision tree process to the input dataset; and based on the application of the trained gradient-boosted decision tree process to the input dataset, generate, for each of the plurality of candidate event assignments, the elements of output data indicative of the expected occurrence of the second event associated with the corresponding one of the plurality of targeted classes of events during the future temporal interval.

* * * * *